(12) United States Patent
Mistry et al.

(10) Patent No.: US 9,407,451 B1
(45) Date of Patent: Aug. 2, 2016

(54) INTEGRATING TELEPHONY APPLICATIONS AND TELEVISION BROADCASTS ON A MULTIMEDIA DEVICE

(75) Inventors: Nalin Mistry, Nepean (CA); Zhonghui Yao, Kanata (CA)

(73) Assignee: GENBAND US LLC, Plano, TX (US)

( * ) Notice: Subject to any disclaimer, the term of this patent is extended or adjusted under 35 U.S.C. 154(b) by 1718 days.

(21) Appl. No.: 12/330,899

(22) Filed: Dec. 9, 2008

Related U.S. Application Data

(60) Provisional application No. 61/053,782, filed on May 16, 2008.

(51) Int. Cl.
*H04N 7/173* (2011.01)
*H04L 12/28* (2006.01)
*H04N 1/00* (2006.01)

(52) U.S. Cl.
CPC ........ *H04L 12/2801* (2013.01); *H04N 1/00106* (2013.01)

(58) Field of Classification Search
USPC .......................................................... 725/106
See application file for complete search history.

(56) References Cited

U.S. PATENT DOCUMENTS

| | | | |
|---|---|---|---|
| 6,882,709 B1 * | 4/2005 | Sherlock et al. ........... | 379/90.01 |
| 7,636,578 B1 * | 12/2009 | Cope et al. .................... | 455/466 |
| 7,694,127 B2 | 4/2010 | Adams et al. | |
| 7,792,094 B1 * | 9/2010 | Cope et al. .................... | 370/352 |
| 7,903,661 B2 | 3/2011 | Biswas et al. | |
| 2005/0047395 A1 * | 3/2005 | Narin et al. ................... | 370/352 |
| 2006/0085832 A1 * | 4/2006 | Groff et al. ................... | 725/106 |
| 2006/0239255 A1 | 10/2006 | Ramachandran et al. | |
| 2008/0104630 A1 * | 5/2008 | Bruce et al. ...................... | 725/31 |
| 2008/0108348 A1 | 5/2008 | Kottilingal et al. | |
| 2008/0159136 A1 | 7/2008 | Mallesan | |
| 2008/0162720 A1 | 7/2008 | Gulati et al. | |
| 2008/0168503 A1 * | 7/2008 | Sparrell .......................... | 725/58 |
| 2009/0003315 A1 | 1/2009 | Devdhar et al. | |

OTHER PUBLICATIONS

Related application: Subhra Saha et al.; Adaptive Intelligent Optimal Registration Interval Determination Algorithm Ensuring High Availability, filed Dec. 29, 2008 as U.S. Appl. No. 61/141,008.
Related application: Robert Denman et al.; Systems and Methods for Enabling Personalization of Data Service Plans filed Nov. 16, 2010 as U.S. Appl. No. 61/414,272.

(Continued)

*Primary Examiner* — Yassin Alata
(74) *Attorney, Agent, or Firm* — Haynes and Boone, LLP

(57) ABSTRACT

Systems and methods for integrating telephony and multimedia content include concurrently displaying a graphical user interface and a video channel of a media broadcast on a screen of a multimedia device. The graphical user interface has a graphical element by which an end-user of the multimedia device can select execution of an interactive application that invokes a telephony service. In response to a selection of the interactive application by the end-user, a message is sent to a networked resource requesting the telephony service. The requested telephony service can be to ignore, reject, or forward the incoming telephone call. Alternatively, the requested telephony service can be a click-to-call. Other interactive applications can request access to an address book, acquire presence information, or request an RSS (Really Simple Syndication) feed.

32 Claims, 15 Drawing Sheets

(56) References Cited

OTHER PUBLICATIONS

Related application: Nalin Mistry et al.; Integrating Telephony Applications and Television Broadcasts on a Multimedia Device filed May 16, 2008 as U.S. Appl. No. 61/053,782.
Related application: Robert Denman et al.; Systems and Methods for Dynamic Congestion Management in Communications Networks filed Dec. 6, 2010 as U.S. Appl. No. 61/420,272.
Related application: Frederick Kemmerer et al.; Systems and Methods for Intelligent Network Edge Traffic and Signaling Management filed Mar. 3, 2011 as U.S. Appl. No. 61/449,068.
Related application: Subhra Saha et al.; Adaptive Intelligent Optimal Registration Interval Determination Algorithm Ensuring High Availability, filed Mar. 14, 2009 as U.S. Appl. No. 12/404,286, now issued as U.S. Pat. No. 7,945,663 on May 17, 2011.
Related application: Robert Denman et al.; Systems and Methods for Enabling Personalization of Data Service Plans, filed Aug. 31, 2011 as U.S. Appl. No. 13/222,807.
Gill, Phillipa et al., "YouTube Traffic Characterization: A View From the Edge", IMC '07, Oct. 24-26, 2007, San Diego, California, USA, 14 pages.
"Amdocs Policy Controller/PCRF" found at <http://www.bridgewatersystems.com/Policy-Controller.aspx> copyright 1996-2009, Bridgewater Corporation, printed Jan. 16, 2012, 2 pages.
"Bytemobile—Reduce Data Traffic—Lossy Media Optimization" found at <http://archive.org/web/2010102605027/http://bytemobile.com/products-applications/mfs-lossy-media-optimization.html>, on the Internet archive, copyright 2010, Bytemobile, Inc., printed Jan. 16, 2012, 1 page.
"Genband: Traffic & Policy Management" found at <http://genband.com/products/traffic-policy-management.com>, copyright 2012 Genband, printed Jan. 16, 2012, 1 page.
"MDX 9000 Series Media Distribution Switch", found at <http://web.archive.org/web/20100731024602/http://verivue.com/products-verivue-media-distribution-platform-content-distribution-switch.asp>, on the Internet archive, copyright 2010, Verivue, Inc., printed Jan. 16, 2012, 1 page.
"Putting Policy Control to Work", found at <http://www.fiercewireless.com/story/putting-policy-control-work/2010-09-27-0>, copyright 2011, FierceMarkets, printed Jan. 16, 2012, 3 pages.
Related application: Nalin Mistry et al.; Integrating Telephony Applications and Television Broadcasts on a Multimedia Device, filed Dec. 9, 2008 as U.S. Appl. No. 12/330,899.
Corresponding non-final Office Action and accompanying PTO-892 mailed Jan. 26, 2012 for related application U.S. Appl. No. 12/330,899 listed above.
Corresponding Applicant's response filed Feb. 20, 2012 to Jan. 26, 2012 Office Action for related application U.S. Appl. No. 12/330,899 listed above.
Related application: Robert Denman et al.; Systems and Methods for Dynamic Congestion Management in Communications Networks filed Dec. 6, 2011 as U.S. Appl. No. 13/312,436.
Related application: Kemmerer et al.; Systems and Methods for Intelligent Network Edge Traffic and Signaling Management filed Mar. 5, 2012 as U.S. Appl. No. 13/412,007.
Related application: Dany Sylvain et al.; Methods, Systems, and Computer Readable Media for Deriving User Availability From User Context and User Responses to Communications Requests filed Jul. 12, 2011 as U.S. Appl. No. 13/180,577.
Related application: Subhra Saha et al.; Adaptive Intelligent Optimal Registration Interval Determination Algorithm Ensuring High Availability filed Dec. 18, 2009 as PCT/US09/68723 and published as WO 2010/078076 on Jul. 8, 2010.
Written Opinion/ISR dated Aug. 3, 2010 for related application PCT/US09/68723 filed Dec. 18, 2009.
J. Lin, The multi-agent rendezvous problem—Part I, Journal on Control and Optimization, 2005.
Venkat Anantharam et al., IEEE Trans on comm., Burst Reduction Properties of the Leaky Bucket Flow Control Scheme in ATM Networks, Dec. 1994, vol. 42, No. 12.
Related Chinese application: CN 200910215530.7 filed Dec. 28, 2009, now abandoned. (Based on U.S. Appl. Nos. 61/141,08 and 12/404,286.).

\* cited by examiner

INTEGRATING TELEPHONY APPLICATIONS AND TELEVISION BROADCASTS ON A MULTIMEDIA DEVICE

RELATED APPLICATION

This utility application claims the benefit of U.S. Provisional Patent Application No. 61/053,782, filed on May 16, 2008, titled System and Method Suitable for Providing Communication Capabilities to a Multimedia Device", the entirety of which application is incorporated by reference herein.

FIELD OF THE INVENTION

The invention relates generally to multimedia devices. More specifically, the invention relates to a system and method for integrating communication capabilities, content, and television on a multimedia device.

BACKGROUND

Multimedia devices are useful for presenting non-interactive content to end-users in a variety of forms, such as text, audio, animation, and video. For example, television viewers watch television broadcasts, which consist of a combination of audio and video signals. To control the functionality of their television sets, the viewers traditionally use their external remote control devices to manipulate the power, volume, display color, and non-interactive content. The television set, however, is an example of a multimedia device that traditionally does not support two-way interactive communications between its end-user viewer and other systems or devices.

To bring interactive communications to such multimedia devices, industry has devised various proprietary server-client architecture solutions. One example solution is the set-top box. In general, a set-top box is electronic equipment that receives a television broadcast over a network (e.g., a cable network) and, from the television signals, produces audio and video output for the television set. The set-top box also brings interactive capabilities to the television set; that is, the television viewer is able to key in certain input, using, for example, a remote control device, that prompts the set-top box to communicate with a system or device on the network.

Traditionally, however, cable operators employed proprietary software in their set-top boxes, referred to as middleware, to perform the interactive communication between the network service and the multimedia device. This proprietary middleware is as a layer of software that executes on top of the operating system running on the set-top box. Interactive applications running on the set-top box were similarly proprietary in that they interfaced specifically with the proprietary middleware.

The proprietary nature of the set-top box presented various problems that slowed innovation in the industry. As an example, interactive applications written for one vendor could not be reused in set-top boxes of other vendors. Interactive applications thus required reinventing and redeveloping for each given set-top box vendor. The process of adding new communication applications to the cable industry hence became particularly cumbersome.

To provide an alternative to proprietary middleware, and thus to encourage innovation, members of the cable television industry developed the OpenCable Platform specification, also known as the OpenCable Application Platform or OCAP. The OpenCable Platform specification defines a standardized (i.e., open) Java-based middleware software layer. Using this open middleware, application developers are able to produce interactive services and applications that can run on a variety of digital set-top boxes and cable-ready devices. This interoperability enables manufacturers to build and sell retail digital devices that are capable of supporting all cable services currently being delivered to leased set-top boxes, and future cable services offered by the cable operator, without the need of a set-top box.

SUMMARY

In one aspect, the invention features a method for integrating telephony and multimedia content, comprising concurrently displaying on a screen of a multimedia device a video channel of a media broadcast and a graphical user interface having a graphical element by which an end-user of the multimedia device can select execution of an interactive application that invokes a telephony service, and sending, in response to a selection of the interactive application by the end-user, a message to a networked resource requesting the telephony service.

In another aspect, the invention features a system for integrating telephony and multimedia services. The system includes a server component and a client component. The server component is configured to communicate with a networked resource in order to provide a telephony service to client components that request the telephony service. The client component is configured to display concurrently on a screen of a multimedia device a video channel of a media broadcast and a graphical user interface having a graphical element by which an end-user of the multimedia device can select execution of an interactive application that invokes the telephony service. The client component is also configured to send, in response to a selection of the interactive application by the end-user, a message to the server component requesting the telephony service.

In still another aspect, the invention features a receiver for integrating telephony and multimedia services, comprising memory storing middleware with an application program interface (API) for providing interactive services at a multimedia device and storing an interactive application that calls the API of the middleware and invokes a request for a telephony service when executed. A video output controller presents a video channel of a media broadcast and a graphical user interface to a multimedia device for concurrent display on a screen of the multimedia device. The graphical user interface has a graphical element by which an end-user of the multimedia device can select execution of an interactive application that invokes the telephony service. A processor is programmed to execute the interactive application in response to a selection of the interactive application by the end-user and to send a message to a server system requesting the telephony service.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Systems described herein integrate communication and content capabilities into television (TV) environments, and can provide two-way interactive digital cable services over a service provider network (e.g., a cable video network). Examples of such interactive services include, but are not limited to, integrated telephony services, program guides, advertisements, games, chat communications, web browsing, and t-commerce (i.e., television commerce). A system includes at least one portable application layered on an open middleware implementation that provides bidirectional interactive communication between an end-user of a multimedia device and a networked resources, device, or system (collectively, networked resource). The interactive communication may be achieved between any kind of multimedia device and networked resource (including content portals and social networks) using, for example, SIP (Session Initiation Protocol), SOA (Service-Oriented Architecture)/web services, Web 2.0 technologies, and proprietary interfaces, which, in some cases are programming language driven (e.g., .NET, Java, PHP (Personal Home Page) or Python).

Figure 1:
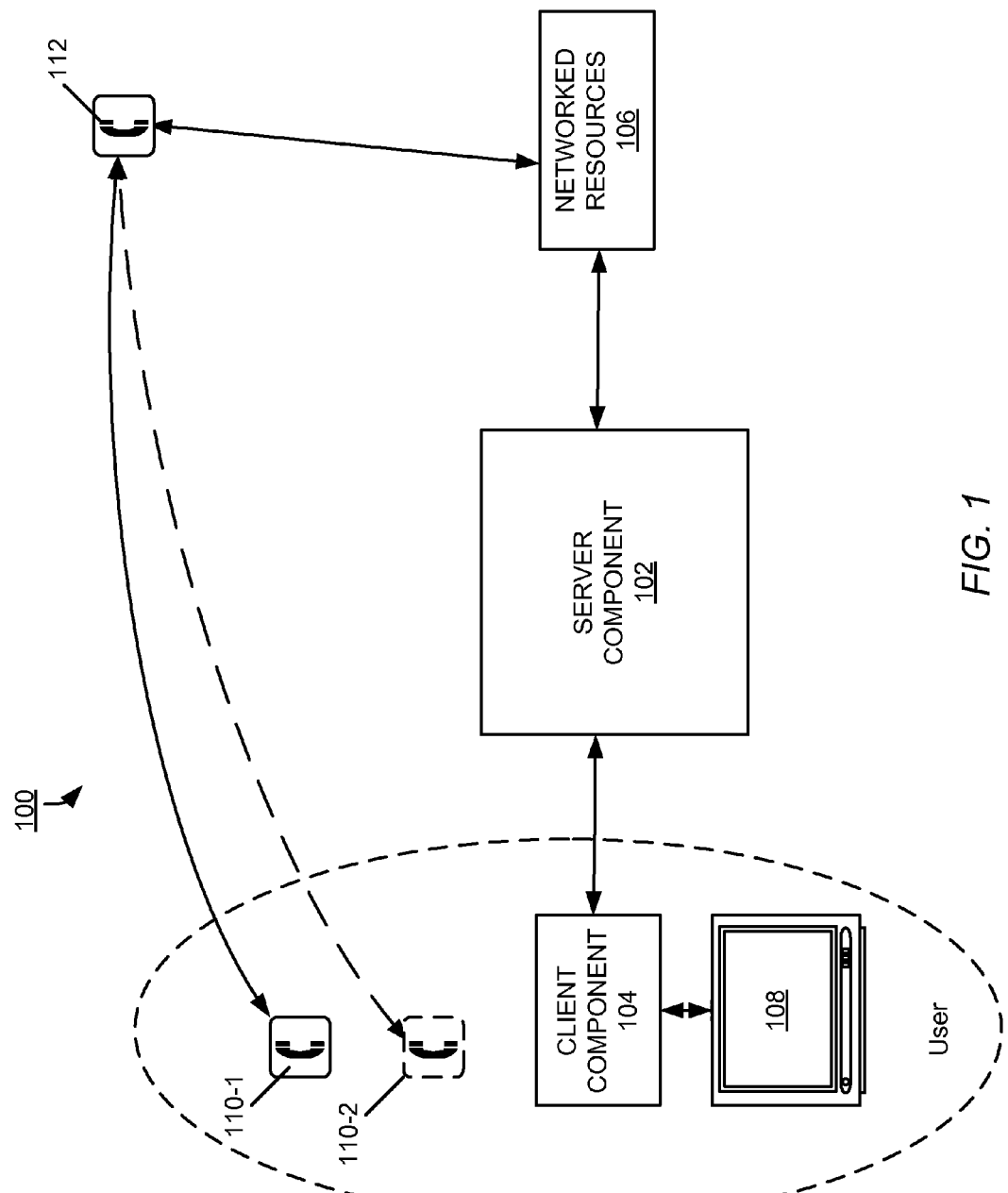
FIG. 1 is a block diagram of a communications system including a client component in communication with a multimedia device and with a server component to provide an end-user of the multimedia device with interactive telephony services.

FIG. 1 shows an embodiment of a system 100 for integrating interactive telephony communication with multimedia content and entertainment on a multimedia device 108. The system 100 includes a server component 102 in communication with a client component 104. As described in more detail below, the server component 102 is in communication with networked resources 106 in order to support interactive cable services, including telephony services, requested by client component 104. Although only one client component 104 is shown, during normal operation, the server component 102 interacts with a plurality of client components.

The client component 104 is in communication with the multimedia device 108. The client component 104 includes a plurality of portable communication applications that run on open middleware software. Such communication applications produce interactive communication content, in addition to non-interactive content received from traditional sources, on the multimedia device 108, which usually lacks bi-directional telephony-related communication capabilities. Examples of such multimedia devices 108 include, but are not limited to, television sets, laptop computers, personal computers, digital video recorders (DVRs), personal video recorders (PVRs), and mobile devices, such as PDAs (personal digital assistants). Because such communication applications run on open middleware, they can support multimedia devices and client components across different vendors. Although shown separately, in some embodiments, the client component 104 can be part of the multimedia device 108 (e.g., CableCARD technology deployed in a DVR). In addition, a user of the multimedia device 108 may have access to one or more telephones 110-1, 110-2.

In one embodiment, the multimedia device 108 is a television set and the client component 104 is part of a digital set-top box (STB). The STB receives a television broadcast over, for example, a terrestrial, cable, or satellite link, which includes television signals for a plurality of channels, which the STB demodulates, decrypts, decodes, and provides as audio and video for display on the screen of the television set. The STB can also combine internally generated graphics with the one or more video channels to be displayed on the television screen. The generated graphics typically include information, such as channel number, a programming guide, program descriptions, and programming time slot. The generated graphics can overlay or appear alongside of the video presented on the screen.

The networked resources 106 include, but are not limited to, voice-over-IP (VOIP) servers, SIP (Session Initiation Protocol) servers, the PSTN (public switched telephone network), IP PBX (Internet Protocol Private Branch Exchange), Instant Messaging (IM) servers, Mobile devices, RSS (Really Simple Syndication) feed sources, Presence servers, Web servers, Multimedia Communication Servers (MCS), and REpresentational State Transfer (REST) servers.

In brief overview, an end-user of the multimedia device 108 can, for example, establish caller identification or call disposition (accept, deny, reject) telephonic communications with another party 112 by submitting a service request through a graphics user interface (GUI) displayed on the screen of the multimedia device 108. The client component 104 receives the service request and communicates with the server component 102 to acquire the desired service. The server component 102 subsequently communicates with the appropriate networked resource 106, which takes the appropriate action to accomplish the requested service functionality. The server component 102 interfaces with the networked resource using, for example, SIP, SOA (Service-Oriented Architecture)/web services, and Web 2.0 technologies.

Figure 2:
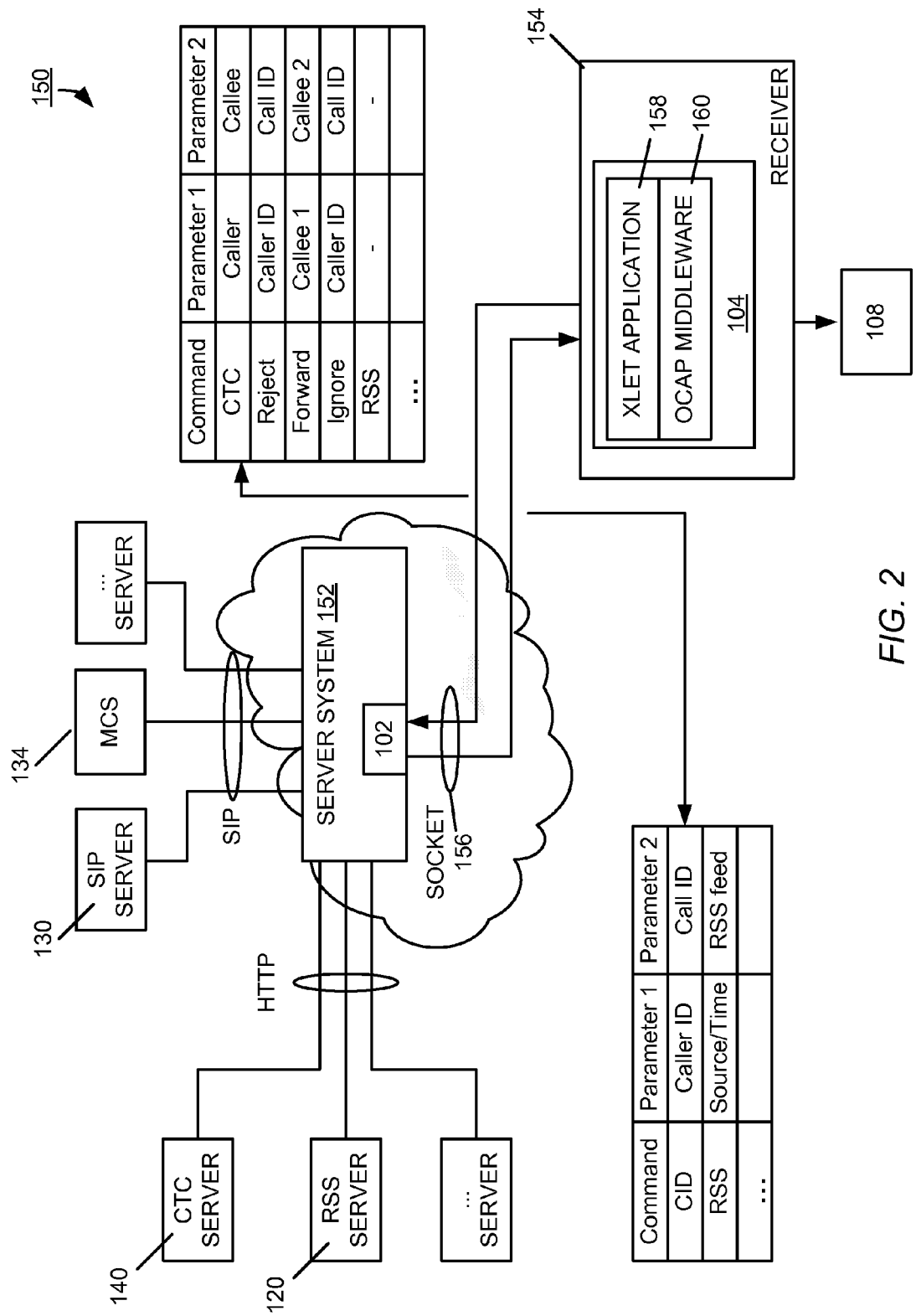
FIG. 2 is a block diagram of an embodiment of the communications system including a server system and client-component constructed in accordance with one embodiment of the invention.

FIG. 2 shows an embodiment of a service provider network 150 including a server system 152 in communication with a receiver 154 through a socket connection 156. Although only one connection to one receiver is shown, it is to be understood that the server system 152 can concurrently support multiple communications with multiple receivers through separate socket connections or the messaging interface described below. In addition, the server system 152 can include one or more server computing machines. An example implementation of the receiver 154 is a set-top box (STB). The server system 152 includes the server component 102 (FIG. 1), and the receiver 154 includes the client component 104 (FIG. 1). Although shown to be operating at different locations, in other embodiments, the server and client components 102, 104 can be collocated within the receiver 154.

The client component 104 includes one or more Xlet applications (XA) 158 and middleware 160. In general, an Xlet application is a software component designed to support digital television. Each Xlet application executes within the context of another program and performs a specific function. Examples of Xlet applications include, but are not limited to, displaying a caller ID, rejecting, ignoring and forwarding incoming telephone calls, getting an RSS feed, performing a click-to-call, making calls, accessing an address book, acquiring presence information about contacts, and accessing and displaying a photo taken from the Web. The server system 152 includes a corresponding application service for supporting each Xlet application 158 of the client component 104.

The middleware 160 includes an application program interface (API) for providing interactive services at the multimedia device. In general, the middleware 160 enables the Xlet applications that call this API to render interactive communication content (in addition to non-interactive content from traditional sources) on the multimedia device 108. In one embodiment, the middleware 160 operates in accordance with the OpenCable Application Platform (OCAP) standard developed by Cable Television Laboratories, Inc. of Louisville, Colo. For this embodiment, the server system 152 and its application services 200 and the receiver 104 and its Xlet applications 158 are also OCAP-compliant.

The server system 152 is in communication with various networked resources 106 in the network 150. For example, as shown in FIG. 2, the server system 152 is in communication with a SIP server 130 and an MCS server 134 through the SIP messaging and with an RSS server 120 and a click-to-call (CTC) server 140 through Web 2.0-based messaging.

Upon start-up, the server system 152 registers with the SIP server 130. When the receiver 154 starts, the receiver 154 establishes the socket connection 156 with the server system 152. At the receiver 154, implementation of the socket connection includes detecting a server connection and server disconnection and automatically reconnecting in the event of a disconnection. Conversely, at the server system 152, functionality for managing the socket connection includes detecting a connection and disconnection with the receiver 154, and automatically establishing reconnection in the event of disconnection. After the socket connection is established, the server system 152 passes a default callee to the receiver 154.

Also on start up, the receiver 154 sends to the server system 152 the telephone number of the telephone to be associated with the multimedia device 108. The telephone is "SimRing" enabled. The server system 152 registers the telephone number of the SimRing-enabled telephone with the SIP server 130.

Through the socket connection 156, the server system 152 and receiver 154 exchange messages constructed in accordance with a messaging protocol. Each message in the protocol, whether originating from the server system 152 or from the receiver 154, is a string (text) message that includes a command accompanied by zero, one, or two parameters and optionally data. Table 1 below provides an example list of the messages in the protocol. It is to be understood that the protocol can have fewer or more messages than those shown, depending upon the types of applications implemented by the system 100.

TABLE 1

| No. | Command | Parameter 1 | Parameter 2 | Data | Description |
|---|---|---|---|---|---|
| 1 | INIT | Default Callee | — | | SN (server system) & STB (receiver) use to establish socket connection. SN passes default callee to STB. |
| 2 | INIT | ACK | — | | STB response to SN with ACK. |
| 3 | CID | Caller ID and Name | Call ID | | Sent by SN to pass Caller ID & Name (if avail) to STB when receiving an incoming call. |
| 4 | CID | ACK | — | | STB response to SN with ACK. |
| 5 | CTC | Caller | Callee | | STB sends to SN to request CTC service. |
| 6 | CTC | — | — | | SN acknowledges invocation of CTC service. |
| 7 | CTC | ACK | — | | STB response to SN with ACK. |
| 8 | IGNORE | Caller ID | Call ID | | STB response to CID command from SN |
| 9 | REJECT | Caller ID | Call ID | | STB response to CID command from SN |
| 10 | FORWARD | Current Callee | New Callee | | STB response to CID command from SN |
| 11 | IGNORE | — | — | | SN response to IGNORE command from STB |
| 12 | REJECT | — | — | | SN response to REJECT command from STB |
| 13 | FORWARD | — | — | | SN response to FORWARD command from STB |
| 14 | IGNORE | ACK | — | | STB response to SN with ACK. |
| 15 | REJECT | ACK | — | | STB response to SN with ACK. |
| 16 | FORWARD | ACK | — | | STB response to SN with ACK. |
| 17 | RSS | | | | STB sends to SN to request RSS service. |
| 18 | RSS | Source & Time Stamp | RSS feed | | SN acknowledges invocation of RSS service. |
| 19 | RSS | ACK | — | | STB response to SN with ACK. |
| 20 | ADDR | INIT | REQUEST | | STB sends initial request of address book to SN. |
| 21 | ADDR | INIT | — | Properties Address Book list | SN response to STB with ACK. |
| 22 | ADDR | UPDATE | — | Properties Address Book | SN sends updated request of address book to SN. |

TABLE 1-continued

| No. | Command | Parameter 1 | Parameter 2 | Data | Description |
|---|---|---|---|---|---|
| 23 | ADDR | UPDATE | ACK | | STB response to SN with ACK. |
| 24 | SMS | Caller | — | Properties Message | SN sends received message to STB. |
| 25 | SMS | ACK | — | | STB responds to SN with an ACK. |
| 26 | SMS | Callee | — | Properties Message | STB replies or sends message to SN. |
| 27 | SMS | ACK | — | | SN responds to STB with an ACK. |
| 28 | SMSHIS | Contact ID | SMS hist. message | | STB sends command to SN to retrieve historical message of specific contact. |
| 29 | SMSHIS | Contact ID | ACK | | SN responds to STB with contact ID and ACK. |
| 30 | RECEIVE | Caller ID | — | | After receiving CID command from SN, STB sends RECEIVE command. |
| 31 | RECEIVE | Media Info | — | | SN takes associated action with the RECEIVE command and send the same command with established media stream information. |
| 32 | CLOG | Contact ID | — | | STB sends the command to SN to retrieve specified contact's log info. |
| 33 | CLOG | Contact ID | Call log XML | | SN responds to STB with retrieved call log info. |
| 34 | CLOG | ACK | — | | STB responds to SN with ACK |
| 35 | PRESENCE | Contact ID | Status | | SN sends the presence status of specified contact id to STB. |
| 36 | PRESENCE | Contact ID | ACK | | STB responds to SN with a contact ID and ACK. |
| 37 | ANSWER | IP address | Port | | STB responds to SN with its IP address and port |
| 38 | ANSWER | ACK | — | | SN responds to STB with ACK |
| 39 | ANSWER | BYE | — | | SN responds with BYE |

Figure 3:
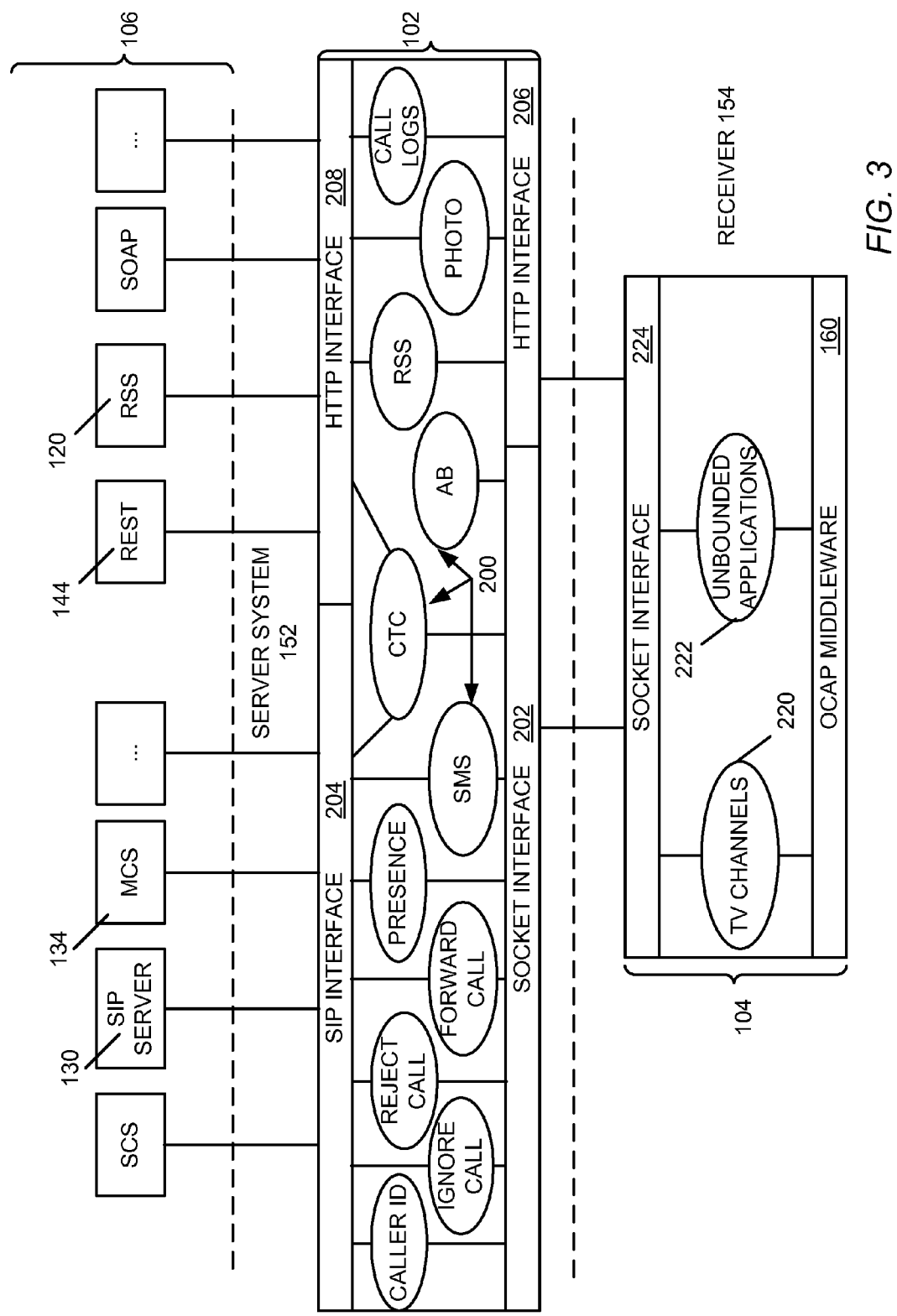
FIG. 3 is a block diagram of an embodiment of the server system and of the client-component of FIG. 2.

FIG. 3 shows an exemplary embodiment of architecture of the server component 102 executing at the server system 152 and of the client component 104 executing at the STB 154. The server component 102 includes software code for providing a plurality of application services 200, a socket interface 202, a SIP interface 204 with a SIP agent (not shown), a socket-facing HTTP interface 206, and an HTTP interface 208.

The server system 152 is in communication with various SIP-enabled networked resources 106 (e.g., SIP server 130, MCS 134) through the SIP interface 204, and in communication with various non-SIP enabled networked resources 106 (e.g., REST server 144, RSS 120) through the HTTP interface 208. The SIP agent of the server system 152 operates primarily as a SIP server that receives/transmits SIP request messages from/to a SIP server (e.g., MCS SIP server) and responds to such requests with SIP response messages. The SIP agent of the server system 152 also operates as a SIP client, for example, when it sends a REGISTER request message to the SIP server (e.g., MCS) at the beginning of a process. The server system 152 also has SimRing capability for sending SimRing commands to SimRing-enabled telephones associated with the server system 152. In this example embodiment, the application services 200 include Caller ID, Ignore Call, Reject Call, Forward Call, Answer Call, Presence, SMS, Click-to-call (CTC), RSS, Call Logs, Address Book (AB), and Photo album. The number and types of application services is illustrative: in general, any number and type of SIP, HTTP, and SOAP-based services can be developed and implemented at the server component 102 for access by the client component 104.

The client component 104 includes TV channels 220, unbounded Xlet applications 222, a secure socket interface 224, and OCAP-compliant middleware 160. An unbounded application continues to run after a user changes a TV channel; that is, the execution of such an application is not coupled to a particular TV channel. The socket interface 224 of the client component 104 is in communication with the socket interface 204 and the socket-based HTTP interface 206 of the server component 102. In addition to supporting multiple TV channels and unbounded Xlet applications, other capabilities of the client component 104 include updating and displaying dynamic information and TV channel information, presenting graphical buttons for user actions, displaying an information banner, and displaying RSS feeds with scrolling capability on the screen of the multimedia device 108.

In one embodiment of the receiver 154, the unbounded Xlet applications 222 include interactive applications for dynamically displaying Caller ID, for disposing of an incoming call, for establishing a call through a click-to-call process, for acquiring an RSS feed, for accessing an address book, for determining the presence of contacts in the address book. For each such application 222, the server system 152 has a corresponding application service 200 that supports the execution of a given interactive application 222. The click-to-call application service 200 can be designed to use either the SIP interface 204 or the HTTP interface 208 in order to communicate with a networked resource 106.

Figure 4:
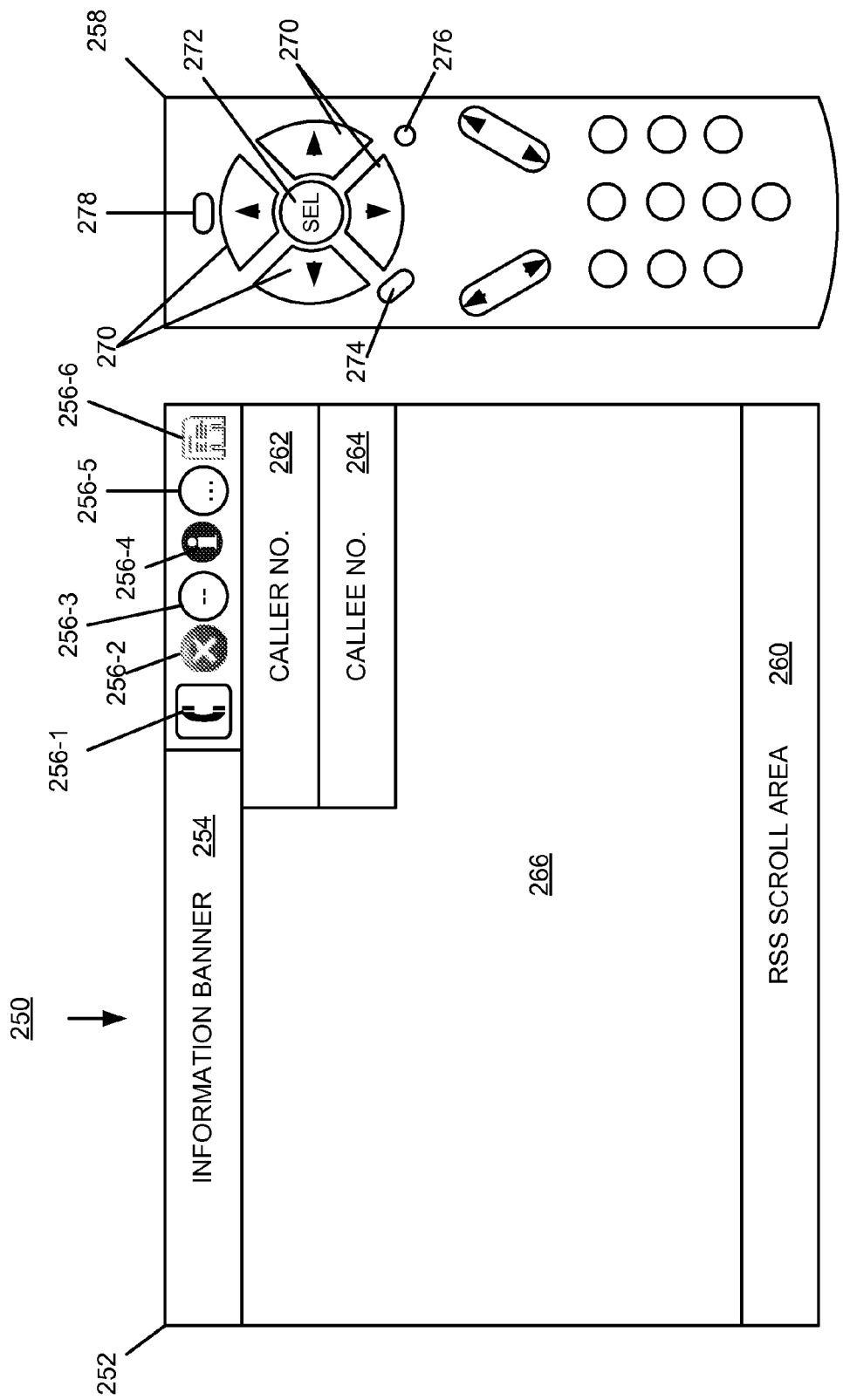
FIG. 4 is a block diagram representation of an embodiment of a graphical user interface displayed on a screen of the multimedia device.

FIG. 4 shows an embodiment of a graphical user interface (GUI) 250 displayed on the screen 252 of the multimedia device 108 in accordance with the client component 104 running on the receiver 154. The particular GUI 250 shown in FIG. 4 is but one illustrative example of the innumerable ways in which content may be presented for user-friendly viewing and navigation. Along the top of the screen 252, the client component 104 produces an information banner 254 and a plurality of application-activation buttons 256-1, 256-2, 256-3, 256-4, 256-5, and 256-6 (generally, 256). In general, the information banner 254 operates to display information dynamically, for example, displaying the Caller ID and name of an incoming call, providing basic instructions when selecting and navigating among the buttons 256, showing the results of an action caused by clicking on a button 256, and presenting a connectivity status between the server system 152 and the receiver 154.

Each of the application-activation buttons 256 corresponds to an unbounded application 222 that the viewer can initiate using the remote controller 258. The user can use the four arrow keys 270 to navigate among the buttons 256. The "SELECT" key 272 can serve to invoke an action, the "SETTINGS" key 274 to enter information, and the "EXIT" key 276 to save and set a newly inputted telephone number. In addition, the "MENU" 278 key can operate to toggle the main GUI (i.e., information banner, buttons & area for scrolling text) between visible and invisible.

As illustrative examples, the button 256-1 corresponds to the click-to-call application, button 256-2 corresponds to an ignore-call application, button 256-3 corresponds to a reject-call application, button 256-4 corresponds to a forward-call application, button 256-5 corresponds to acquiring an RSS feed, and button 256-6 corresponds to accessing an address book. It is to be understood that the practice of the invention can involve fewer or more buttons than those shown. For forwarding a call and click-to-call, a second level of buttons appear that allow the viewer to assign the forwarding number, the caller number, and the callee number with default or new numbers.

Along the bottom of the screen 252, the client component 104 can provide an RSS scroll area 260 for displaying RSS feed information obtained from an RSS source. In one embodiment, the RSS feed information scrolls as a string of text information from right to left across the screen. Depending upon the particular application activated, the client component 104 can use other areas 262, 264 of the television screen to display information, for example, caller and callee telephone numbers. The displays produced by the client component 104 overlays the video content of the TV channels 220. Typically, the screen 252 presents the video content 266 without any overlying displays (i.e., the information banner and buttons are invisible). Overlaid displays appear when specifically activated by the viewer through the remote controller 258 or upon the occurrence of certain events that trigger a display, for example, an incoming telephone call.

Figure 5:
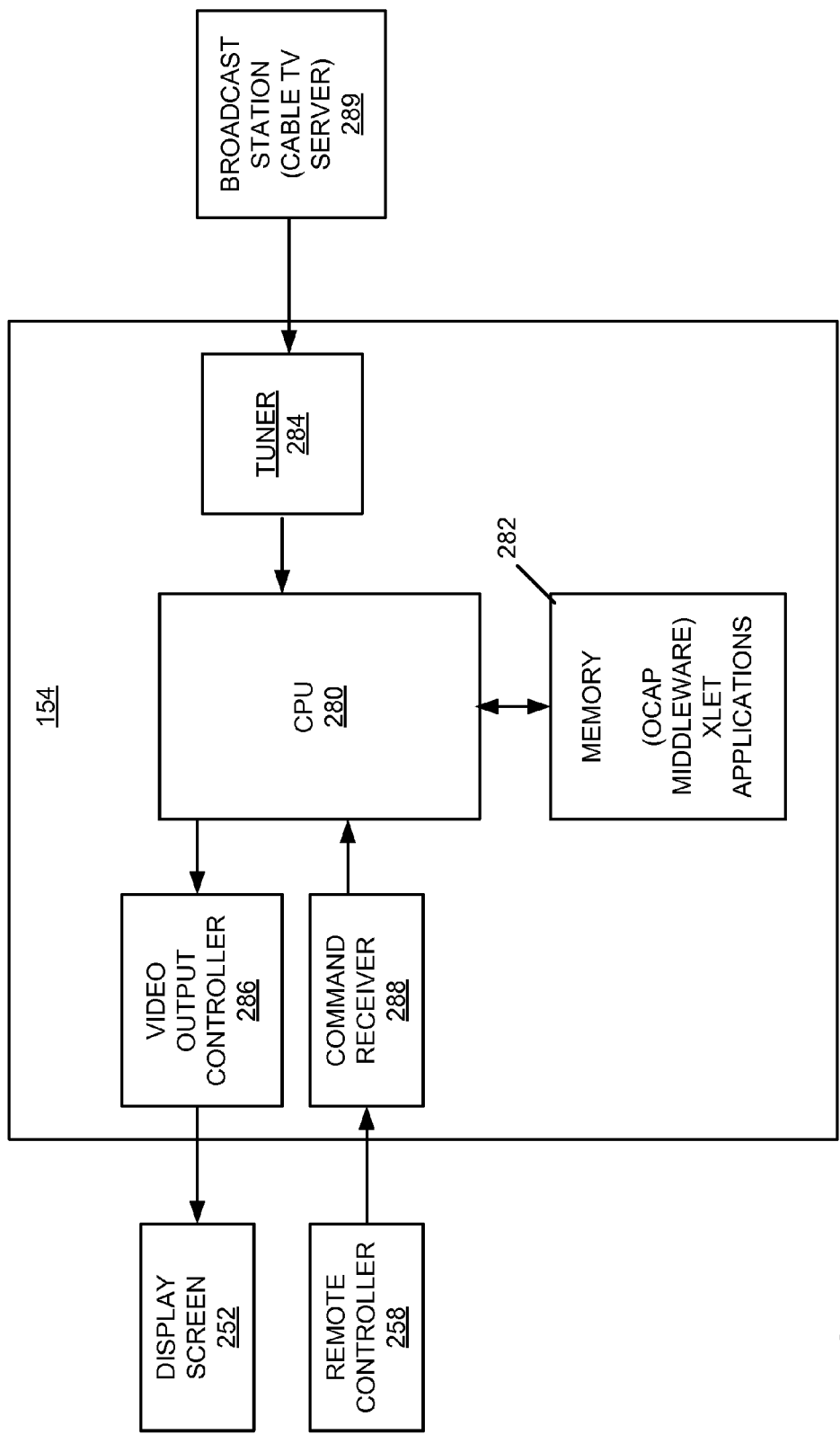
FIG. 5 is a block diagram representation of an embodiment of a hardware configuration of the client component of FIG. 2.

FIG. 5 shows an embodiment of a hardware configuration for the receiver 154. The receiver 154 includes a processor 280, memory 282, a tuner 284, a video output controller 286, and a command receiver 288. The memory 282 stores the various interactive applications 258, the OCAP middleware 160, and other program code for processing the video and audio signals received from the broadcast station 289 and the commands received from the remote control. The receiver 154 also includes an audio output controller (not shown) for outputting audio signals to speakers (not shown) of the multimedia device.

The tuner 284 receives the video and audio signals of the media broadcast and delivers them to the processor 280 for processing. The video output controller 286 controls the video signal to be outputted to the screen 252 of the multimedia device. The command receiver 288 receives user-keyed-in commands from the remote controller 258, and forwards the commands to the processor 280. Based on the particular command forwarded from the command receiver 288, the processor 280 selects and executes one or more of the interactive applications 258 and, depending upon the operation of the interactive application, communicates with the video output controller 286 to update the graphics on the display screen 252 accordingly.

Display of Caller ID

Through the display of the Caller ID, a television viewer receives notification of an incoming call. The Caller ID and name of the caller (if available) appear within the information banner 254 on the screen 252. If the information banner is currently invisible at the time of the incoming call, the Caller ID and name abruptly appear. In one embodiment, a picture (image) or video of the caller also appears if the caller, with the image or video, is listed within the address book (described below) of the viewer. The server system 152 passes the image to the receiver 154 through its HTTP interface 206 (FIG. 3).

To handle incoming calls, the server system 152 includes a SIP agent that receives an INVITE request message from a SIP server (e.g., MCS). Encapsulated within the request message is the caller information, such as Caller ID and name. The SIP agent extracts the caller information and passes it to the receiver 154 through the socket connection 156 using the CID command (Table 1) to pass the information.

Call Disposition

The call disposition applications 222 enable the viewer to respond to the incoming call in one of a plurality of ways: the viewer can ignore the call, reject the call, or forward the call to another telephone number. Using the remote controller 258 (FIG. 4), the television viewer selects the GUI button displayed on the television screen corresponding to the desired action. In the case of forwarding a call, the viewer can use the remote controller to assign forwarding number (i.e., with a default number or a specific new number).

Figure 6:
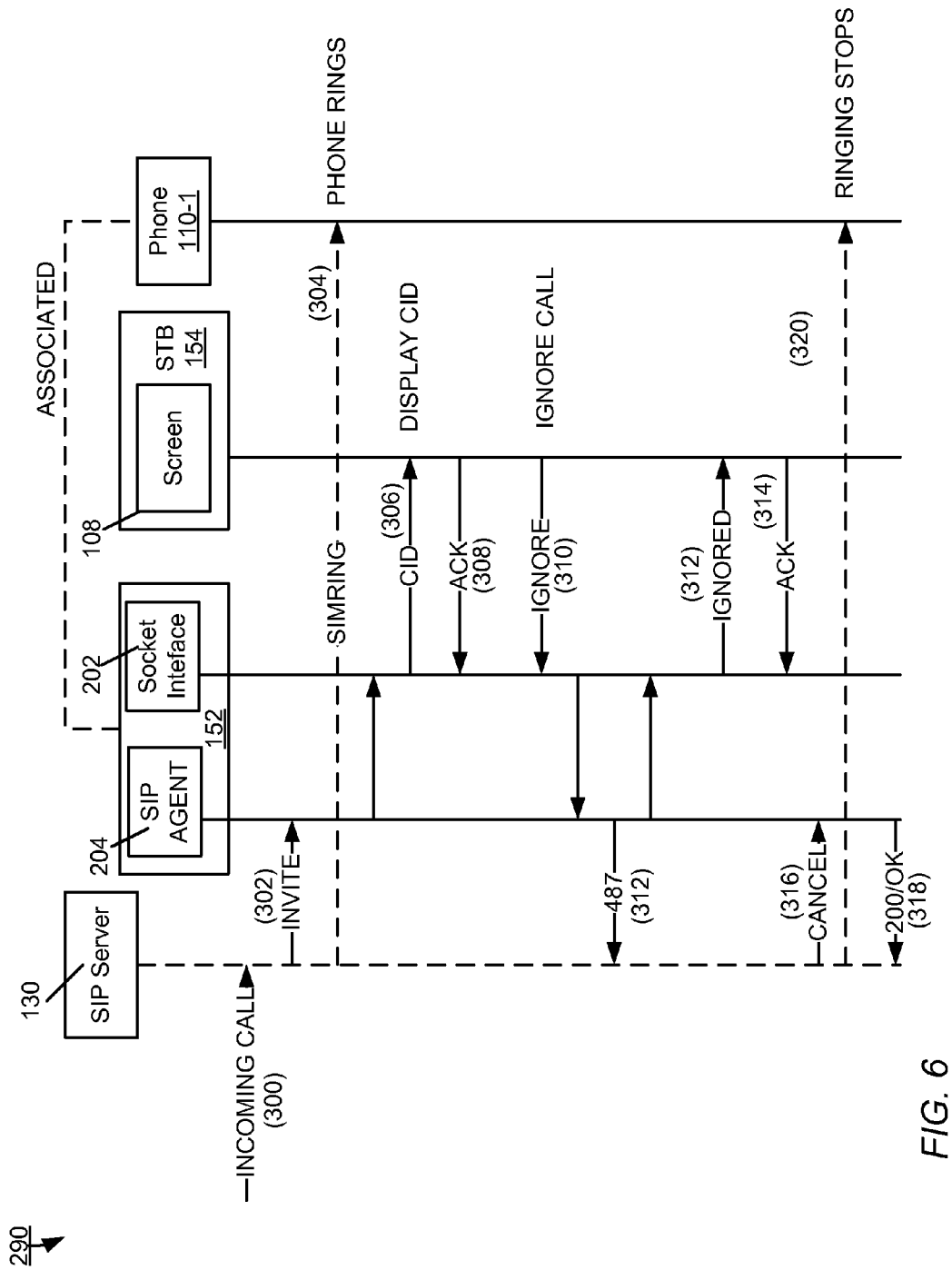
FIG. 6 is a diagram illustrating an embodiment of a process for displaying on the multimedia device a caller ID associated with an incoming telephone call and for submitting a response through the multimedia device to ignore the telephone call.

FIG. 6 shows an exemplary embodiment of a process 290 for ignoring an incoming telephone call through the multimedia device 108. Hereafter, the receiver 154 is referred to as an STB 154. A SIP server 130 receives (300) an incoming call, and sends (302) an invite message to the SIP agent 204 of the server system 152. Concurrently, the SimRing-enabled telephone 110-1 (FIG. 1) associated with the server system rings (304). In response to the incoming call, the SIP agent 204 of the server system 152 executes the caller ID application service 200 (FIG. 3), which forwards the Caller ID through the socket interface 202 of the server system 152. The socket interface 202 then issues (306) a CID command (Table 1) to the STB 154. The caller ID appears on the screen 252 of the multimedia device 108. The STB 154 returns (308) an acknowledgment to the socket interface 202 of the server system 152.

In this example, the user of the multimedia device 108 chooses to ignore the call and, using the keys of the remote controller 258, activates the particular button 256 within the GUI displayed on the television screen 252. An ignore call command (Table 1) passes (310) from the STB 154 to the socket interface 202 of the server system 152. Parameters passed with the ignore command include the caller ID and, optionally, a call ID. The SIP agent 204 receives the command from the socket interface 202, sends (312) a "487" reply to the SIP server 130, and, through the socket interface 202, tells (312) the STB 154 that the incoming telephone call has been ignored. The STB 154 acknowledges (314) the communication from the server system 152.

In addition, the SIP server 130 replies (316) to the server system 152 with a cancel command, which the server system acknowledges (318). The server system 152 also sends (320) an instruction to the telephone 110-1 to cause it to stop ringing.

Figure 7:
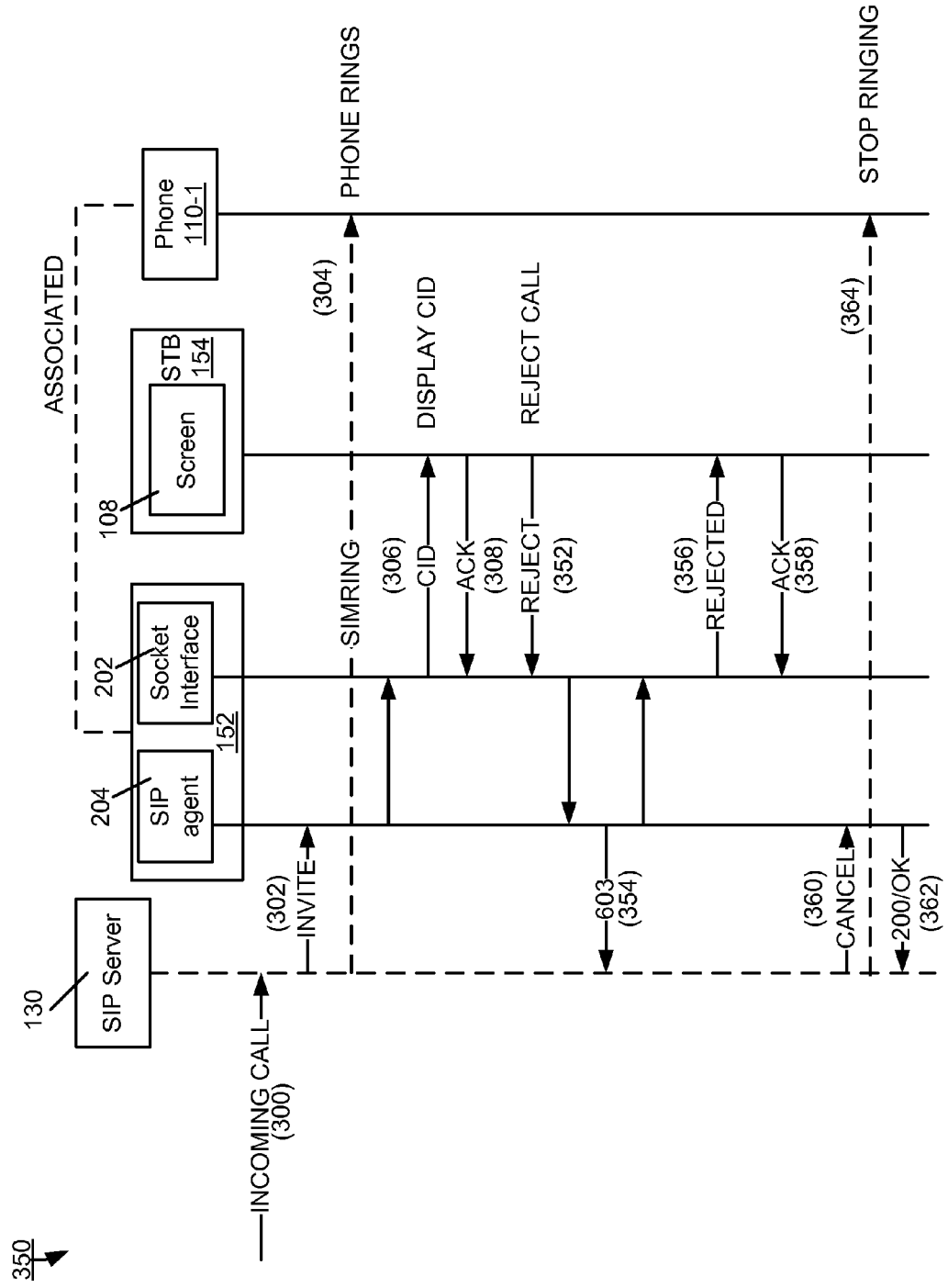
FIG. 7 is a diagram illustrating an embodiment of a process for displaying, on the multimedia device, a caller ID associated with an incoming telephone call and for submitting a response through the multimedia device to reject the telephone call.

FIG. 7 shows an exemplary embodiment of a process 350 for rejecting an incoming telephone call through the multimedia device 108. As described in connection with the process 290 of FIG. 6, a SIP server 130 receives (300) an incoming call and sends (302) an invite message to the SIP agent 204 of the server system 152. In response, the SIP agent 204 executes the caller ID application service 200. In addition, the telephone 110-1 associated with the server system rings (304). Through the socket interface 202, the server system 152 then issues (306) a CID command to the STB 154, including the caller ID and, optionally, the call ID as parameters. The caller ID appears on the screen of the multimedia device 108, and the STB 154 returns (308) an acknowledgment to the socket interface 202 of the server system 152.

In this example, the end-user of the multimedia device 108 chooses to reject the call and, using the keys of the remote controller 258, activates the particular button 256 of the GUI displayed on the television screen 252. A reject call command passes (352) from the STB 154 to the socket interface 202 of the server system 152. The parameters accompanying the reject command include the caller ID. The SIP agent 204 acquires the reject call command from the socket interface 202, and, in response to the command, sends (354) a "603" command to the SIP server 130. In addition, the SIP agent 204, communicating through the socket interface 202, tells (356) the STB 154 that the incoming telephone call has been rejected (using a reject command). The STB acknowledges (358) the communication from the server system 152. Further, the SIP server 130 replies (360) to the server system 152 with a cancel command, which the server system acknowledges (362). The server system 152 also sends (364) a message to the telephone 110-1 to cause it to stop ringing.

Figure 8:
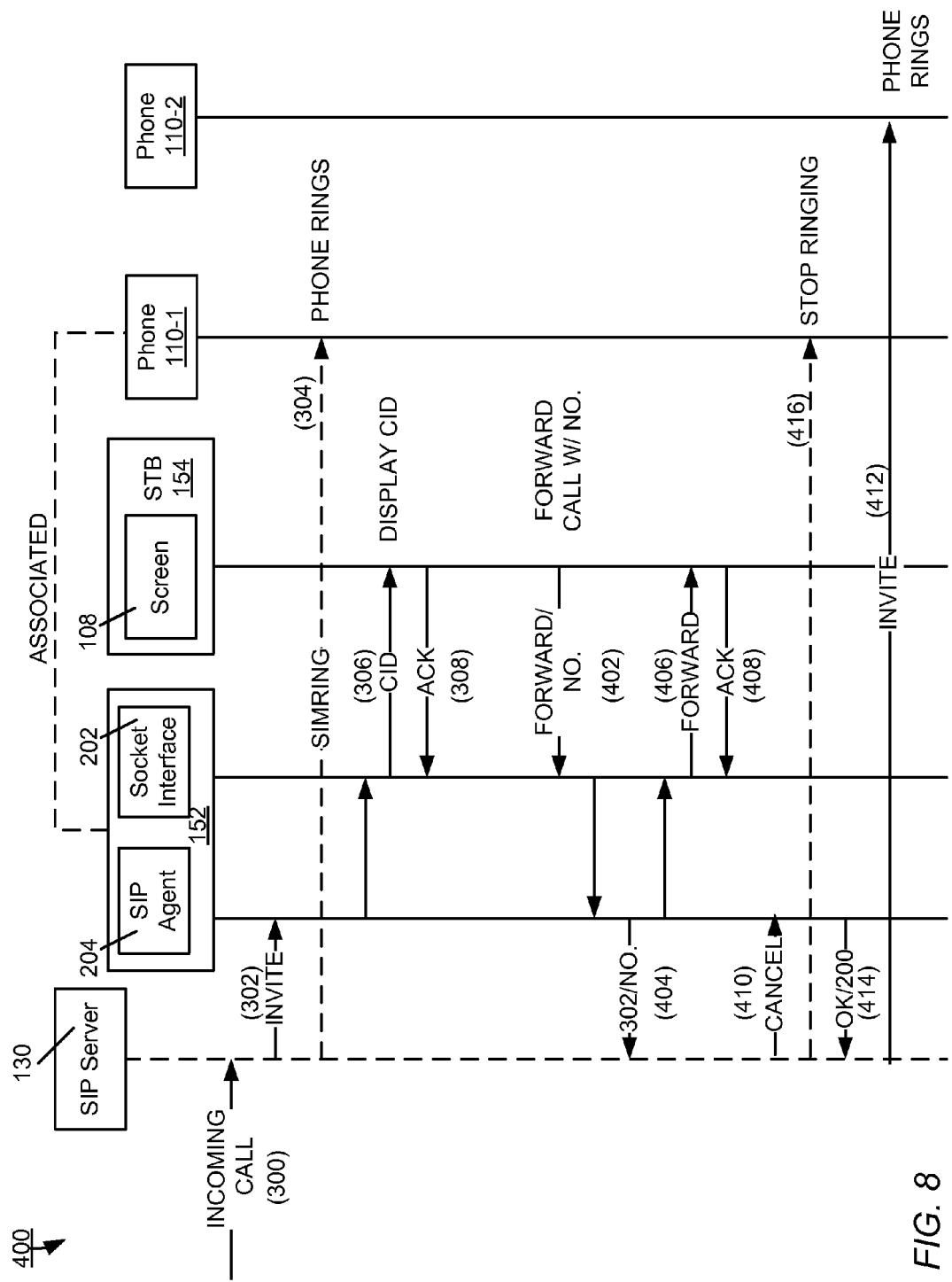
FIG. 8 is a diagram illustrating an embodiment of a process for displaying, on the multimedia device, a caller ID associated with an incoming telephone call and for submitting a response through the multimedia device to forward the telephone call to another specified telephone number.

FIG. 8 shows an exemplary embodiment of a process 400 for forwarding an incoming telephone call intended for a first telephone 110-1 to a second telephone 110-2 by issuing a forwarding command through the multimedia device 108. A SIP server 130 receives (300) an incoming call and sends (302) an invite message to the SIP agent 204 of the server system 152. In response, the SIP agent 204 runs the caller ID application service 200. Additionally, the telephone 110-1 associated with the server system rings (304). The socket interface 202 then issues (306) a CID command to the STB 154, the caller ID appears on the screen of the multimedia device 108, and the STB 154 returns (308) an acknowledgment to the socket interface 202 of the server system 152.

In this example, the user of the multimedia device 108 chooses to forward the call to the second telephone 110-2. For instance, the second telephone 110-2 may be a cell phone that is more conveniently accessible to the user than the ringing telephone 110-1. To forward the incoming call, the user activates the particular button 256 within the GUI displayed on the screen 252. The GUI prompts the end-user to supply the telephone number to which the call is being forwarded. By way of the remote controller, the user can select a default telephone number or enter a new telephone number. After the selection of the forwarding telephone number, the STB 154 sends (402) a forward call command (Table 1) to the socket interface 202 of the server system 152. The current called telephone number and the forwarding telephone number are parameters sent with the forward call command. In response to the forward call command and parameters, the server system 152 runs the forward call application service 200, with the SIP agent 204 sending (404) a 302 message to the SIP server 130 with the forwarding telephone number. Through the socket interface 202, the SIP agent 204 sends (406) a forward command to the STB 154 to signify that the incoming telephone call has been forwarded. The STB 154 acknowledges (408) the communication.

In addition, the SIP server 130 replies (410) to the server system 152 with a cancel command and sends (412) an invite message to the second telephone 110-2, causing it to ring. The server system 152 acknowledges (414) the cancel command from the SIP server 130, and sends (416) an instruction to the telephone 110-1 to cause it to stop ringing.

Click-to-Call

The click-to-call application 222 enables the end-user of the multimedia device 108 to initiate a third-party call between a caller and a callee, using default telephone numbers or specified telephone numbers. Telephony-related features described herein support PSTN telephone numbers and SIP addresses. In one embodiment, the viewer can locate the contact information of an individual in an address book (described below) and initiate a click-to-call while viewing that contact information.

Figure 9:
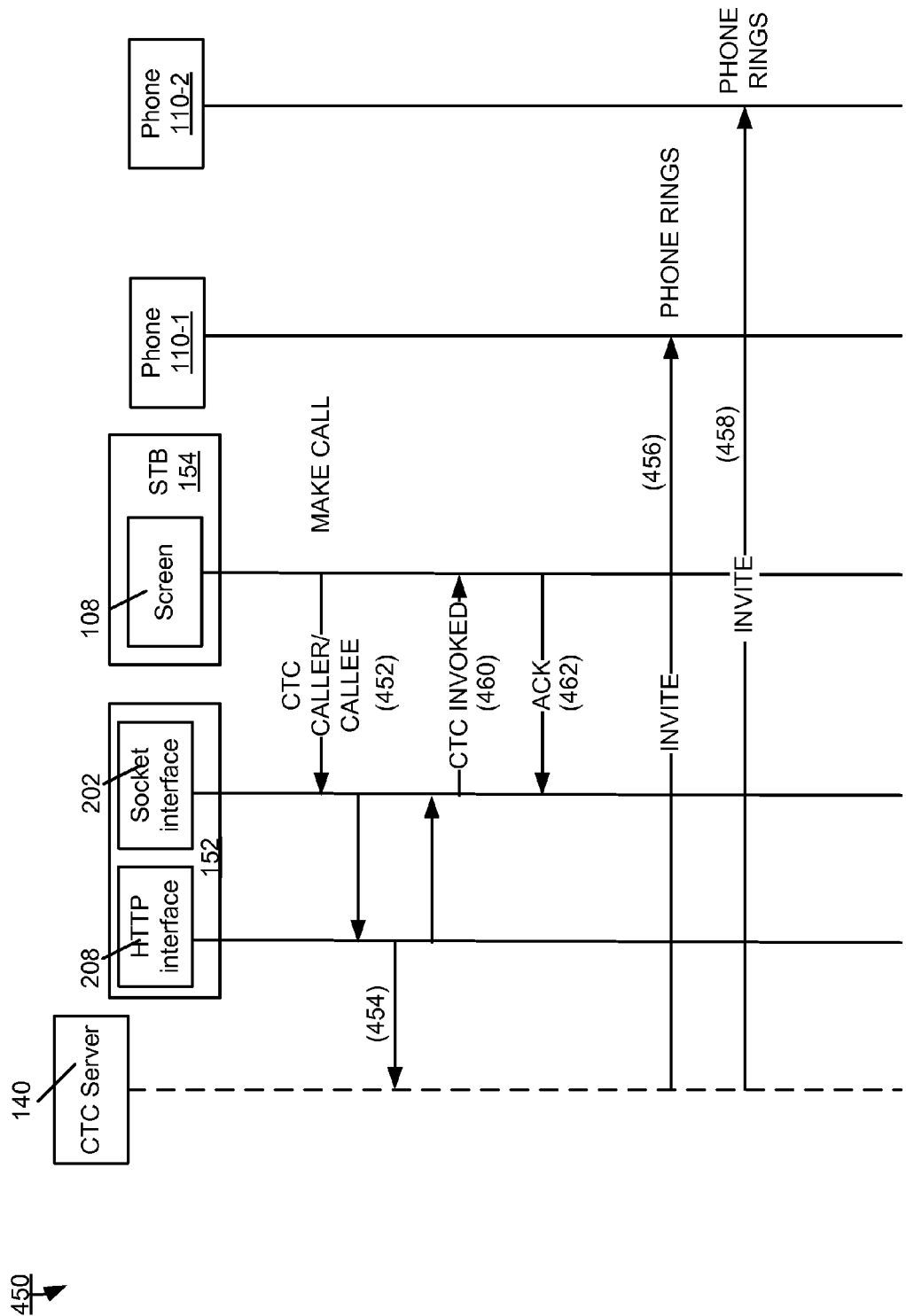
FIG. 9 is a diagram illustrating an embodiment of a process for initiating a click-to-call through the multimedia device.

FIG. 9 shows an embodiment of a process 450 for initiating a telephone call between two telephones 110-1, 110-2 through the multimedia device 108 by activating the click-to-call application (also known as a "third-party call"). An end-user selects the click-to-call button 256 on the GUI, and is prompted to provide a caller phone number and a callee phone number. The caller and callee telephone numbers can be predefined default numbers, or new numbers submitted by the end-user through the remote controller.

After the end-user selects or submits the requested information, the STB 154 sends (452) a CTC command (Table 1) with two parameters (the caller and callee phone numbers) through the socket interface 202 of the server system 152. In response to the CTC command, the server system 152 invokes (454) a click-to-call web service (e.g., REST) from the CTC server 140 through the HTTP interface 208. In an alternative embodiment, the server system 152 invokes a SIP-based service through the SIP interface 204.

The CTC server 140 sends (456, 458) invites to the telephones 110-1, 110-2 of the caller and callee, respectively, causing both telephones to ring. Additionally, the server system 152 sends (460) a CTC command through the socket interface 202 to the STB 154 to signify that the click-to-call has been invoked. The STB 154 acknowledges (462) the communication.

Get RSS Feeds

The RSS feed application 222 enables the television viewer to obtain an RSS feed from a specified RSS source. Through the GUI on the screen 252 of the multimedia device 108, the viewer can choose from among RSS sources. In one embodiment, the RSS feed scrolls from right to left within the RSS scroll area 260 along the bottom of the screen.

Figure 10:
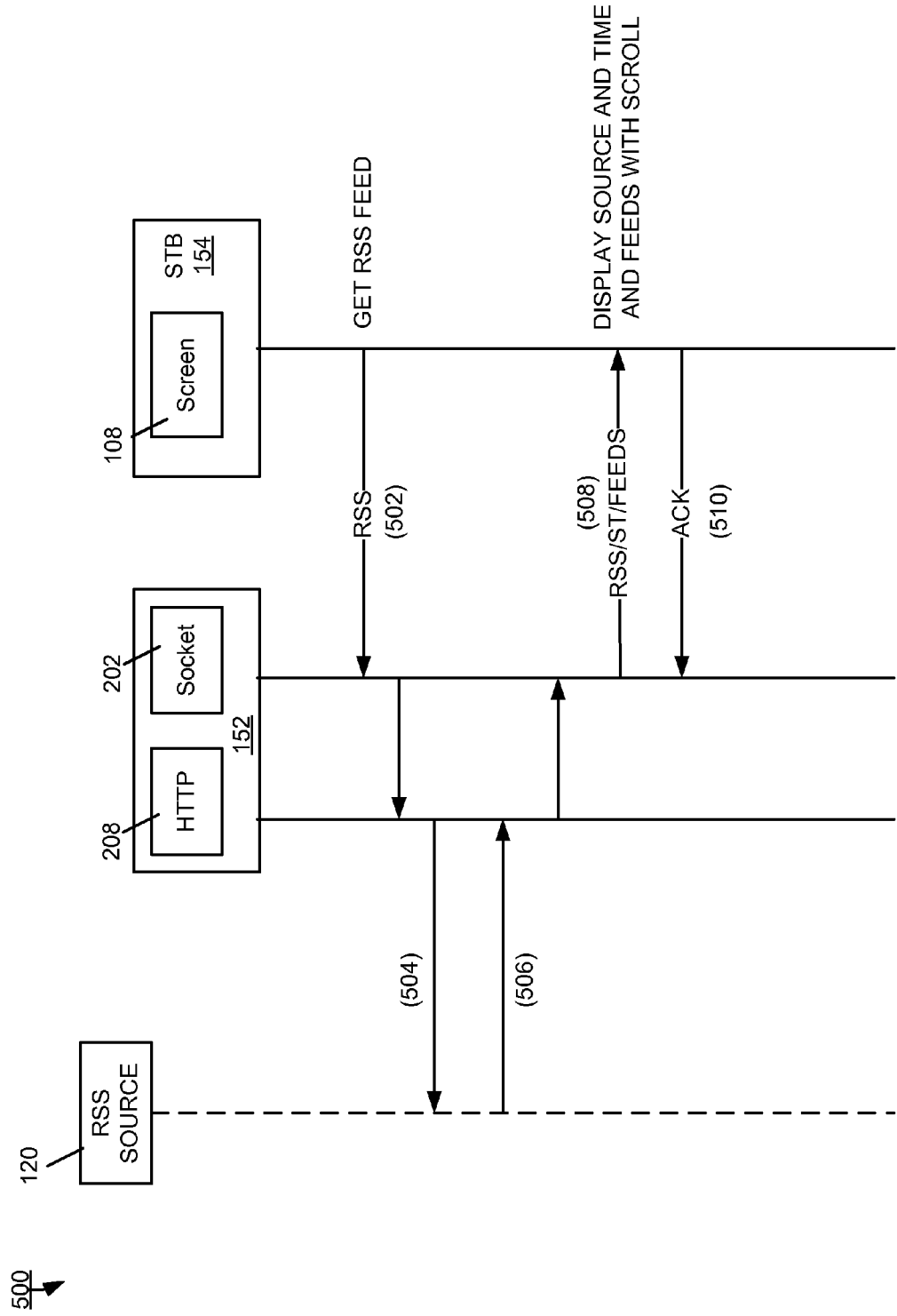
FIG. 10 is a diagram illustrating an embodiment of a process for acquiring an RSS feed through the multimedia device.

FIG. 10 shows an example of a process 500 for acquiring and displaying an RSS feed on the screen of the multimedia device 108. After the end-user activates the "Get RSS feed" button on the GUI, the RSS feed application prompts the end-user to provide the identity of the RSS feed. After the end-user submits the RSS feed identity, the STB 154 sends (502) an RSS command (Table 1) with one parameter (the RSS feed identity) to the server system 152. The server system 152 sends (504) a RSS feed request through the HTTP interface 208 to the identified RSS source 120. In one embodiment, the RSS feed application uses Java™ RSS-related APIs (Application Program Interface) to communicate with the RSS source directly.

The RSS source 120 replies (506) with an RSS XML (eXtensible Markup Language) file. The RSS feed application parses the RSS XML file and sends (508) a text string to the STB 154, including the identity of the RSS source and the publication date (i.e., timestamp). The text string scrolls across the RSS scroll area 260 of the display screen. The RSS source identity and time appear in the information banner 254.

Address Book

The Address Book application 222 enables the end-user to access his or her contact information, which has been preconfigured into the STB 154 before the Address Book application begins. The end-user activates the address book application by using the remote controller to select the corresponding button presented on the GUI. A list of contacts appears on the screen of the multimedia device 108. Contact information and the presence status (described below) of each contact can appear adjacent that contact. In addition, the address book is used for displaying an image of a caller in addition to the caller ID. The status of any given contact changes dynamically and concurrently with changes at the MCS (Multimedia Communication Server) client.

The end-user can step through the list of contacts using the directional keys 270 of the remote controller 258. The end-user can also select a highlighted contact by pressing the select key 272, causing detailed contact information of that contact, and one or more buttons for user navigation, to appear on the screen. Such contact information can include the contact's name, address, phone number, age, relationship, and photograph. Navigation buttons include, but are not limited to, a "previous", "more", "return", "CTC", and "SMS". The end-user is able to use the directional keys 270 of the remote controller 258 to navigate through the list of contacts. For example, the end-user can navigate to and select the CTC button to start a click-to-call between this contact and the default callee. If the end-user navigates to the SMS button and selects the SMS, the GUI becomes visible. Through the GUI, the end-user can then retrieve or send an SMS message.

Figure 11:
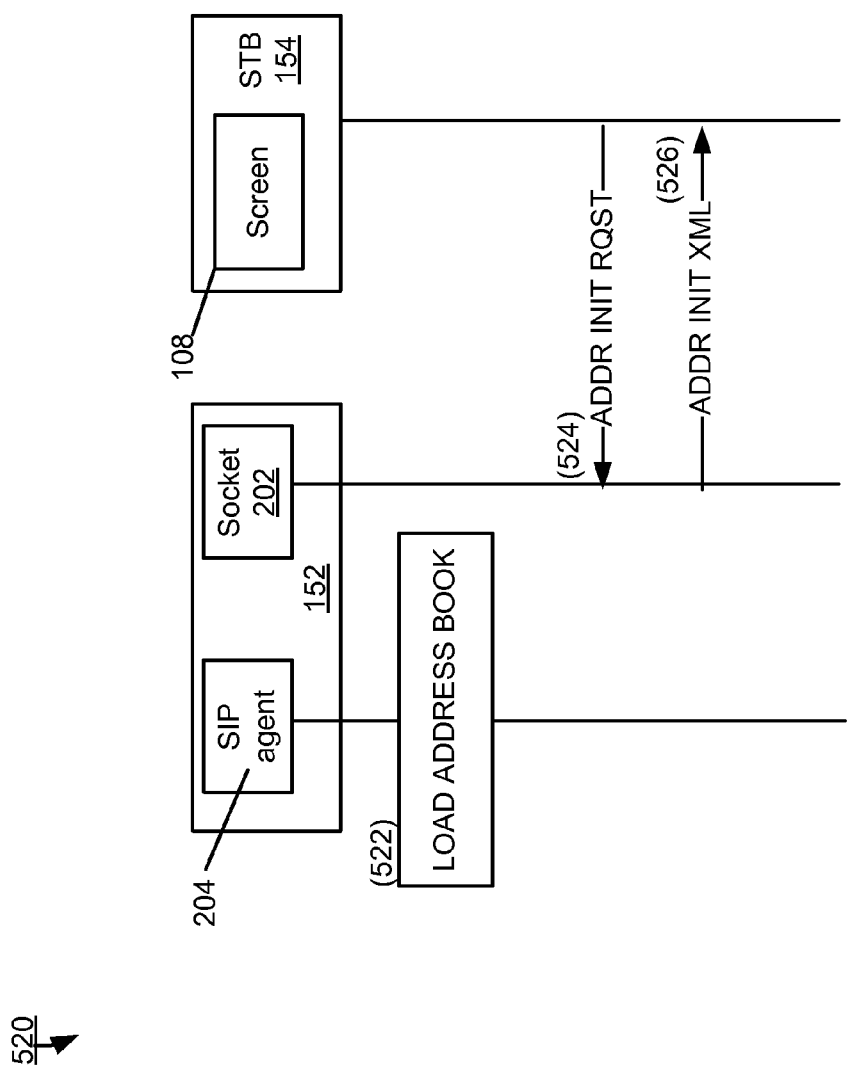
FIG. 11 is a diagram illustrating an embodiment of a process for acquiring access to an address book maintained at the server system.

FIG. 11 shows an example of a process 520 for accessing the address book. Upon start-up, the server system 152 loads (552) a preconfigured address book (list of contacts), for example, as an array. The preconfigured address book is stored at the server system 152 in an XML file with predefined format (i.e., an XSD (XML Schema Definition) file). Each address in the address book can include, for example, name, age, status, relationship, notes, picture path (small and large icons), and a video path. The server system 152 updates the array, that is, in particular, the presence status of the contacts in the array, when notify messages (as part of the presence service) are received.

Through the STB 154, the end-user sends (524) an address command (Table 1) to the server system 152, to request access to the address book. The address command includes two parameters: (1) init, and (2) request. The server system 152 responds (526) with an address command with one parameter (init), effectively acknowledging the request, and with a XML file containing the list of contacts and associated contact information.

Presence Status

The Presence status application enables an end-user to see the presence status of a specific contact (e.g., online, offline, busy). In addition, the end-user can receive a status notification on the screen of the multimedia device 108 with an updated presence status when status of the contact changes.

Figure 12:
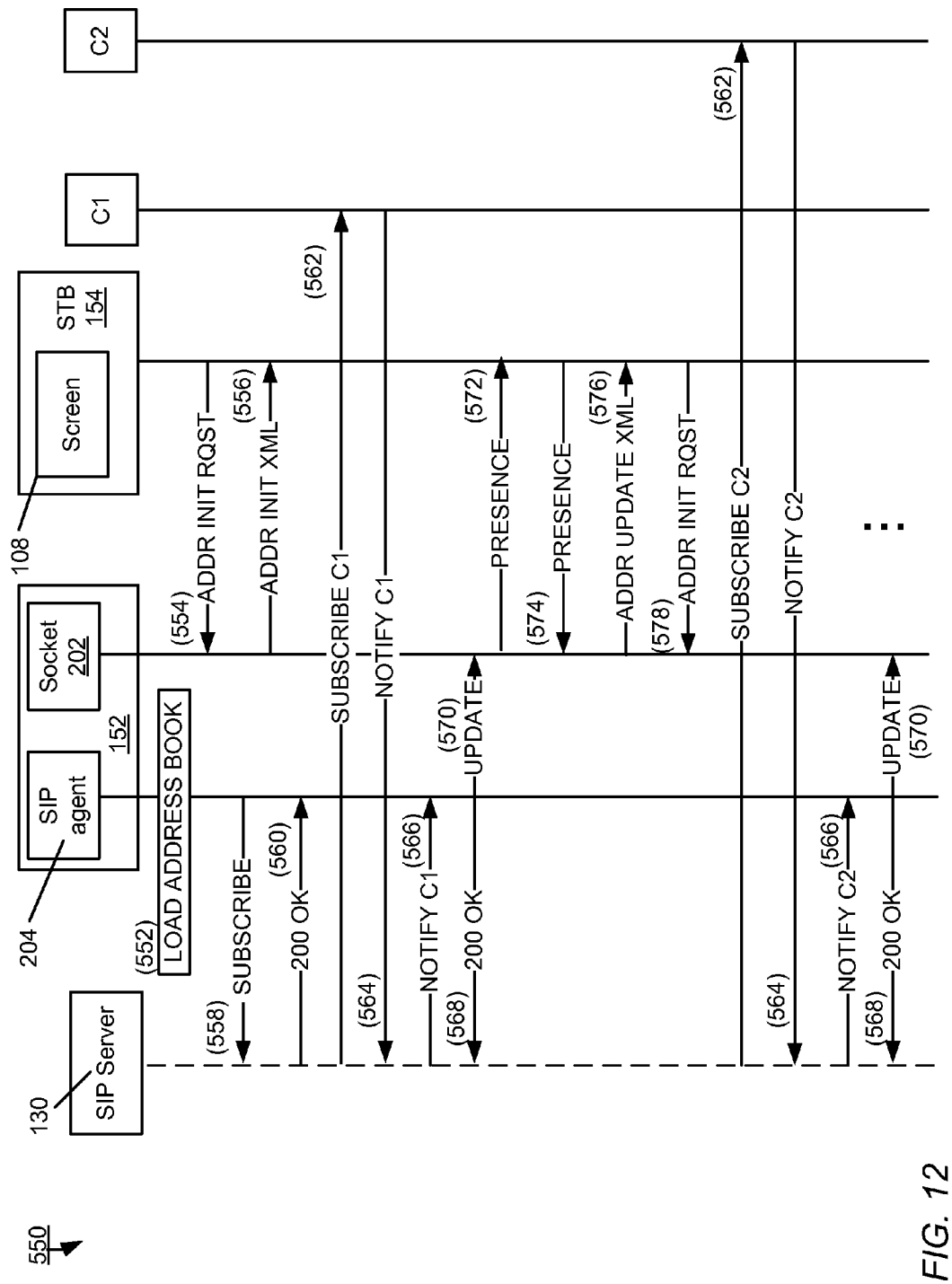
FIG. 12 is a diagram illustrating an embodiment of a process for acquiring presence information for a contact in the address book.

FIG. 12 shows an example process 550 for acquiring presence information regarding a contact in an address book. Upon start-up, the server system 152 loads (552) a preconfigured address book (list of contacts). Through the STB 154, the end-user sends (554) an address command, with the two above-described parameters, to the server system 152, to request access to the address book. The server system 152 responds (556) with an address command with one parameter (init), effectively acknowledging the request, and with a XML file containing the list of contacts and associated contact information.

To acquire the presence status of every contact in the address book, the server system 152 sends (558) a SUBSCRIBE SIP message to the SIP server 130. The server system 152 sends the SUBSCRIBE message periodically, because each subscription expires. The SIP server 130 acknowledges (560) the SUBSCRIBE message and notifies (562) each of the subscribed-to contacts, here, in FIG. 12, represented by contacts C1 and C2, of the subscription. Each subscribed-to contact automatically sends (564) a notify message, which includes the presence status of the contact, to the registered address of the server system 152 (maintained at the SIP server 130). The SIP server 130 forwards (566) the presence status information to the server system 152.

After receipt of the presence status information, the server system 152 acknowledges (568) the receipt and determines if the presence status of a contact has changed. Upon detecting a change, the server system 152 updates (570) the status of the contact in the address book at the server system and sends (572) a presence command (Table 1) to the STB 154, with an identifier of the contact and status as parameters, to update dynamically the presence status of the contact on the screen of the multimedia device 108. The STB 154 replies (574) with a presence command, with the contact identifier and acknowledgment as parameters, to acknowledge the updated presence status communication.

The server system 152 also sends (576) an address command with an update parameter and with the list of contacts in the address book to the STB 154 to update dynamically the contact information displayed on the screen of the multimedia device 108. The STB 154 acknowledges (578) this communication by responding with an address (ADDR) command, including an update parameter and an ACK parameter.

SMS Messaging

Figure 13:
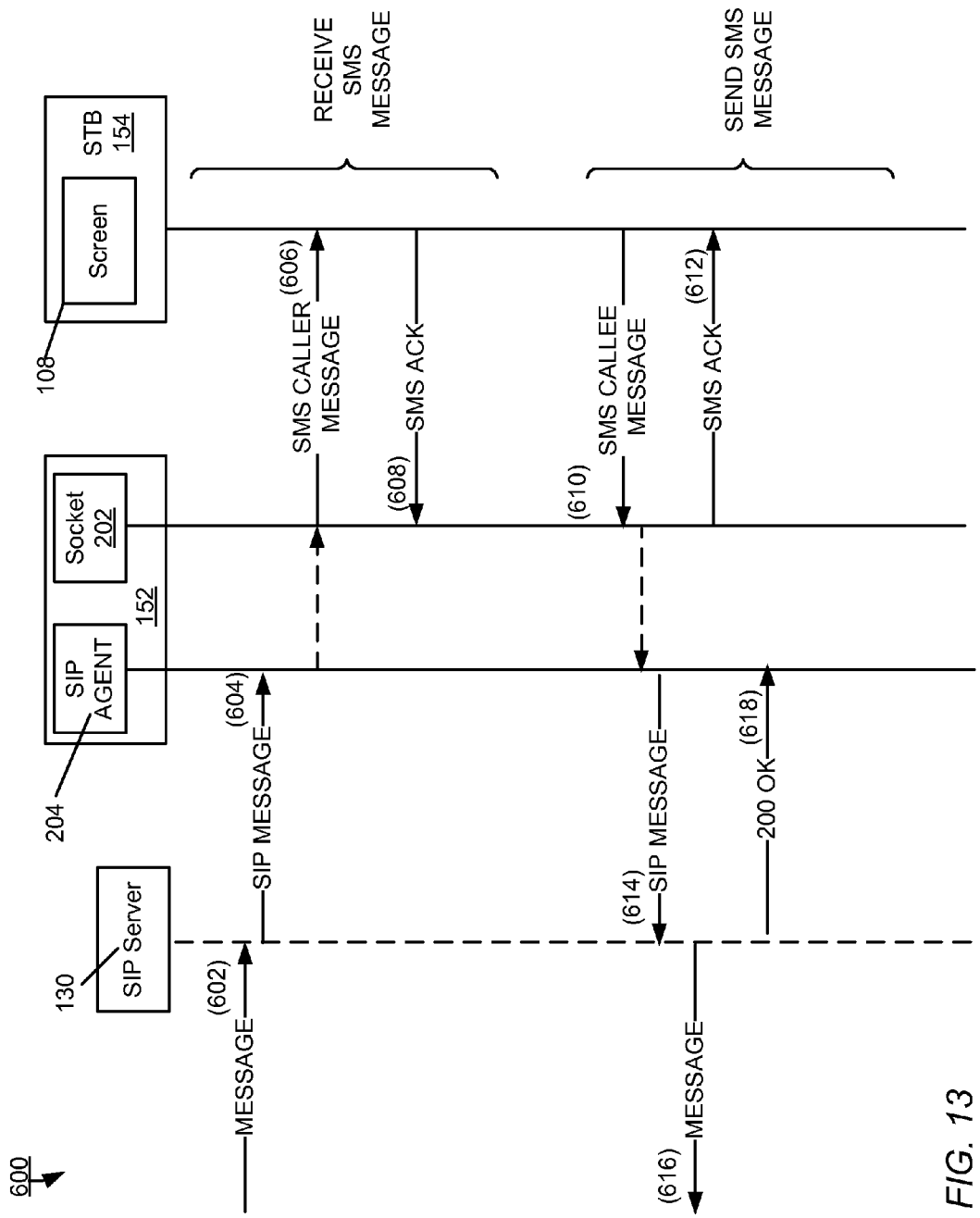
FIG. 13 is a diagram illustrating embodiments of processes for sending and receiving SMS (Short Message Service) or MMS (Multimedia Messaging Service) messages.

The SMS messaging application 222 enables an end-user of the multimedia device 108 to send and receive SMS messages. FIG. 13 shows an example of a process 650 for receiving SMS messages at and sending SMS messages from the multimedia device 108. (The process is similar for MMS messages.) With respect to receiving an SMS message: the SIP server 130 receives (602) an SMS message sent to the registered address of the server system 152. After receiving the message, the SIP server 130 sends (604) a SIP message to the server system 152, which includes the SMS message. The server system 152 sends (606) an SMS command (Table 1) to the STB 154 for display on the screen of the multimedia device 108. The SMS command includes the identity of the caller (i.e., message sender) as one parameter and the contents of SMS message. Thus, the end-user of the multimedia device is notified of an incoming SMS (or MMS) message. Displayed on the screen are the caller number, caller name, callee number, and text message or picture(s). In reply, the STB 154 sends (608) an SMS command to the server system 152, with an acknowledgement (ACK) as an included parameter.

With respect to sending an SMS message, the end-user uses the remote controller to select the SMS messaging application for sending an SMS message. The STB 154 sends (610) an SMS command, with the address of the callee (i.e., target of the SMS message) and the message as parameters, to the server system 152. The server system 152 responds by replying (612) with an SMS command that acknowledges the communication and by sending (614) a SIP message containing the SMS message to the SIP server 130. The SIP server 130 sends (616) the SMS message to the callee and replies (618) to the server system 152 with an acknowledgement.

In addition, the server system 152 stores all SMS messages and organizes such SMS messages according to contact. The end-user can then search the history of SMS messages through the GUI on the screen of the multimedia device. Upon end-user selection, the STB 154 retrieves the SMS messages of a given contact. After selecting one of the messages for review, the end-user has the option of replying to this message. Other features supported for SMS messaging include, but are not limited to, (1) providing an SMS alert on the information banner and on the GUI of the address book; and (2) displaying a retrieved SMS message at the bottom of the screen using scrolling text and in the GUI presented for SMS.

The end-user is also able to select a contact in the address book and then an SMS message to send to that individual. In one embodiment, the SMS messages that may be sent are pre-configured in the STB 154, for example, pre-configured SMS messages such as "Hello", "I'm home", and "Call me." Alternatively, the end-user can enter a message through the numerical keys of the remote controller 258 in cell phone-like fashion: that is, the end-user enters each letter of the message by pressing a numerical key of the remote controller the particular number of times required to produce that letter.

Call Logs

The Call-logs application 222 allows an end-user to see the history of incoming telephone calls and SMS messages on the screen of the multimedia device 108. Each incoming call in the history includes the caller name and call ID. Each displayed SMS message in the list includes the name of the sender and the time of the SMS message.

Figure 14:
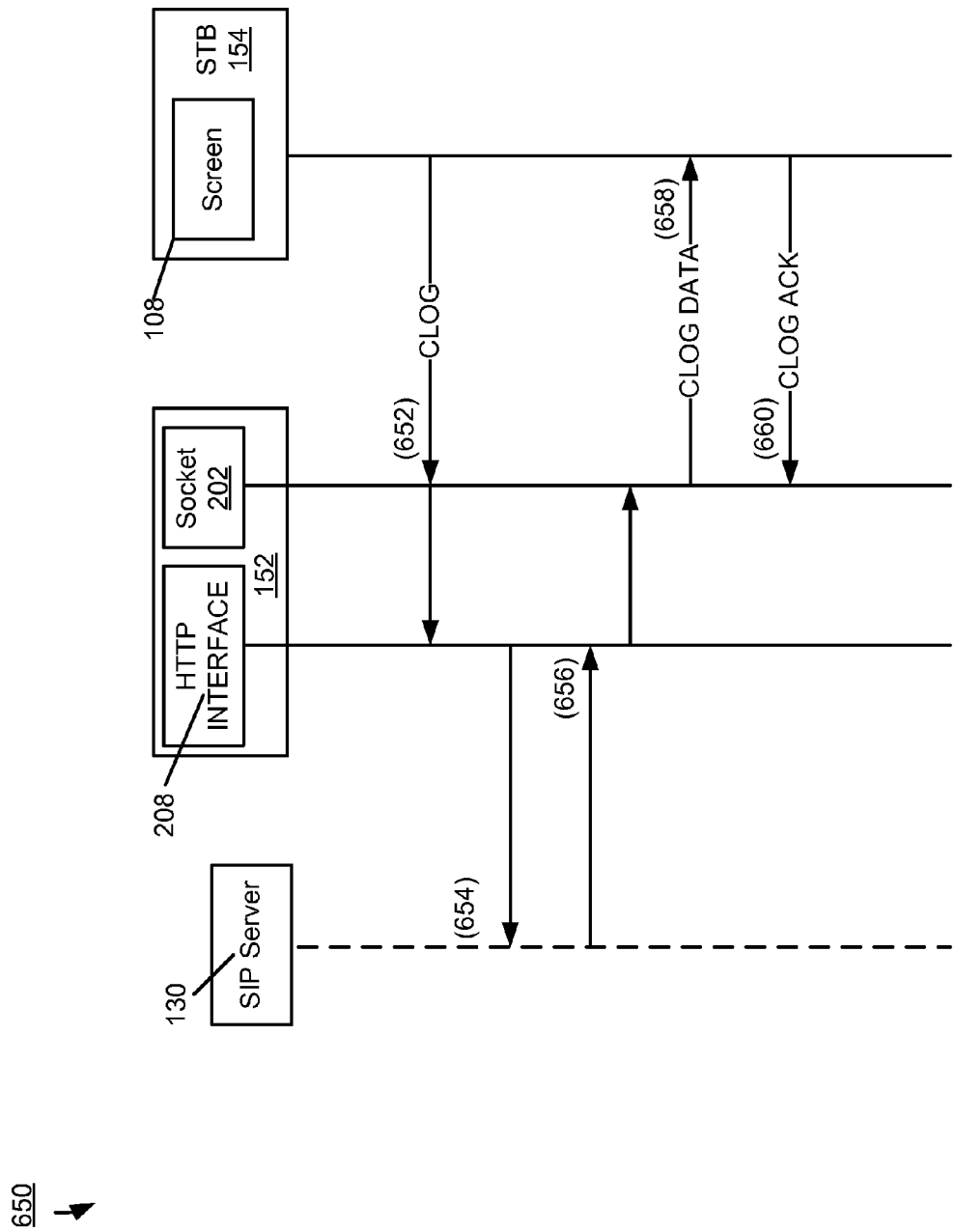
FIG. 14 is a diagram illustrating an embodiment of a process for acquiring a call log of incoming calls or SMS messages.

FIG. 14 shows an example of a process 650 for retrieving, by an end-user of the multimedia device 108, the historical logs of incoming telephone calls and SMS messages. Through the GUI, the end-user of the multimedia device selects the call-logs application. The STB 154 sends (652) a CLOGS command (Table 1) to the server system 152. As a parameter, the command includes the identity of the contact for which the call log is desired. Through the HTTP interface 208, the server system 152 invokes the SOAP Call-log service of the SOAP server (not shown). The SOAP Call-log service sends (654) a request to the SIP server 130 for the call log of the default callee, which returns (656) the call log to the server system 152. The server system 152 sends (658) a CLOG command to the STB 154 with the identity of the contact and the associated call log. The call log displays on the screen of the multimedia device. The STB 154 acknowledges (660) the communication by sending, in reply, a CLOG command with an acknowledge (ACK) parameter. At the STB 154, CTC is associated with call logs. For example, within a Call-log GUI, the end-user can navigate between call log items in the call log using the arrow keys of remote controller 258. When the end-user presses the "SELECT" key while a specific call log item is highlighted on the screen, the click-to-call service can be invoked based on information recorded in this specific call log item.

Caller ID, Image, and Live Video of the Caller

Figure 15:
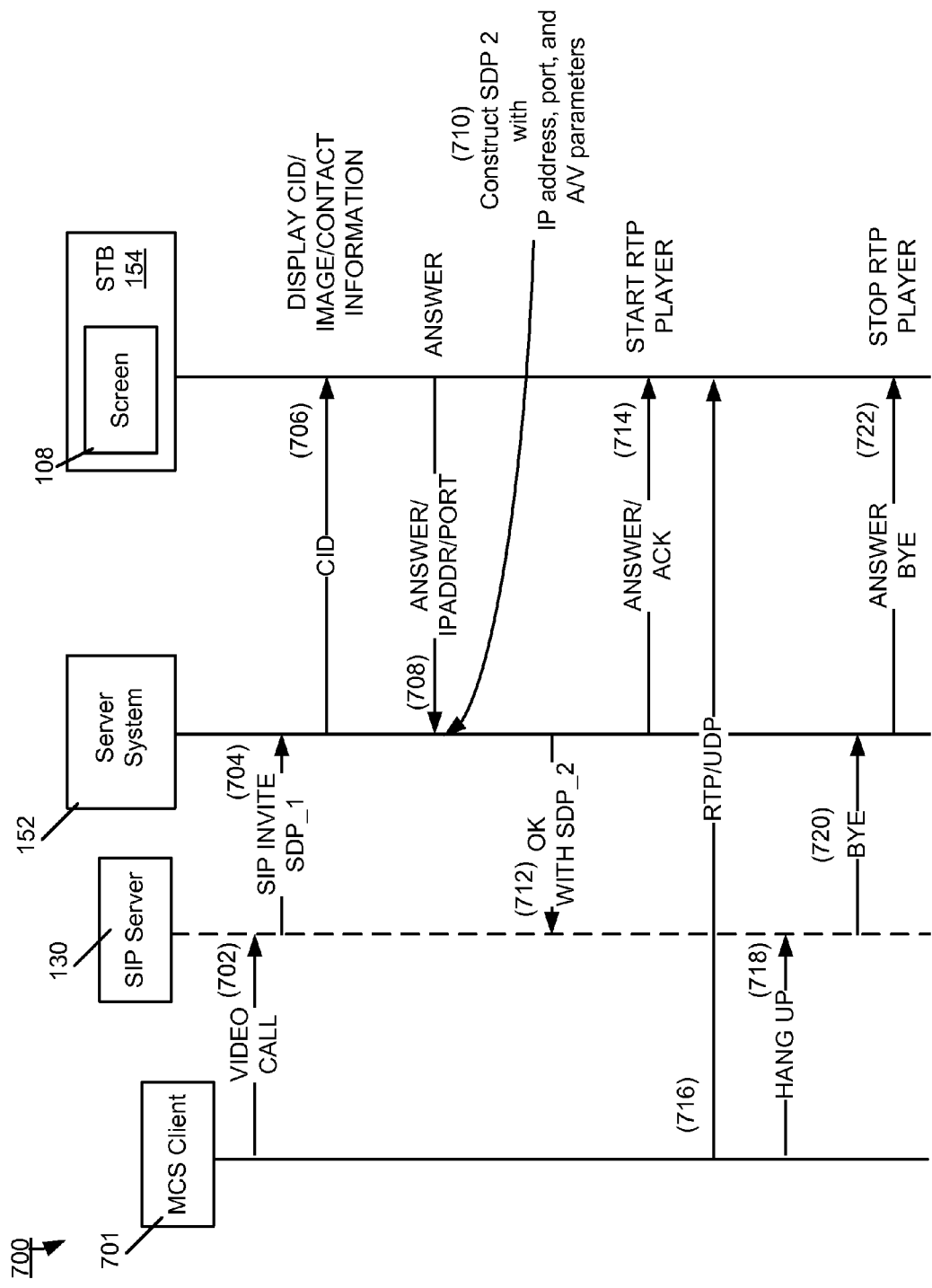
FIG. 15 is a diagram illustrating an embodiment of a process for streaming media to the screen of the multimedia device.

FIG. 15 shows an embodiment of a process 700 for displaying a media stream of an established multimedia connection on the screen of the multimedia device. The process can be used to enable the end-user to see video content from the caller, provided the caller uses a camera, while listening to the caller's voice on the telephone. The SIP server 130 receives (702) a video call message from an MCS client 701 and, in response, sends (704) an invite SDP (Session Description protocol) message, identified in FIG. 15 as SDP_1, to the server system 152. The server system 152 sends (706) the caller ID command with the caller ID to the STB 154 through the socket interface 202. The STB 154 replies with a CID acknowledgment (not shown). In addition, the STB 154 displays the caller ID, image, and contact information on the screen. At this point, the address book (i.e., XML file) is local to STB 154 having been obtained during the initialization stage when the server system 152 and STB start. The contact information and the HTTP URL of the image are obtained from the address book. In addition, the images are obtained from the HTTP URL through the HTTP interface (i.e., 206 in FIG. 3).

When the caller ID appears on the screen, the end-user can select to answer the call by activating a corresponding button on the GUI. The selection causes the STB 154 to send (708) an answer command (Table 1) to the server system 152, including the IP address and port number of the STB.

In response to the answer command, the server system 152 constructs (710) a new SDP message, identified in FIG. 15 as SDP_2, and sends (712) a SIP message to the SIP server 130. The SIP message includes the SDP_2 message with the IP address, port number, and audio/video (A/V) parameters of the STB 154. The server system 152 also responds (714) to STB with an answer command (with an acknowledgement parameter). When the STB 154 receives the acknowledgement, it starts its RTP (Real-time Transport Protocol) player and waits for the RTP/UDP (user datagram protocol) stream, listening to the media port included in its answer command (708) and in the server system's 152 SDP_2 message. The STB 152 consequently receives (716) the media stream (audio and video) directly from the MCS client 701, in "peer-to-peer" fashion, without any intervening handling of the media stream by the server system 152.

After the SIP server 130 determines that the MCS client has hung up (718), the SIP server 130 sends (720) a "BYE" SIP message to the server system 152. In response, the server system 152 sends (722) an answer command to the STB 154. The answer command includes "bye" as a parameter. From this command, the STB 154 knows to stop its RTP player.

Photo Album

The photo album application 222 enables an end-user to display images and video stored at a web site on the screen of the multimedia device. The end-user clicks the corresponding button on the GUI displayed on the screen. As part of the execution of the photo album application, the STB 154 prompts the end-user to provide the address location of the image or video content to be downloaded to the screen and any username and password information needed to access the content. The STB 154 sends a command (with the address, username, and password) to the server system 152 to activate a corresponding service application. The server system 152 uses the supplied information to acquire the image or video from the web site (through the HTTP interface 208), and forwards the image or video through the socket connection to the STB 154 as a parameter of a command. Upon receiving the Voice Mail The voice mail application enables an end-user to receive, on the screen of the multimedia device 108, notifications of new unheard voice mail messages. To listen to a voice mail message, the end-user navigates to the corresponding voice mail button on the main GUI using the arrow keys of remote controller. When the end-user presses the SELECT key of the remote controller, a call is established between the telephone number for the voice mail system and the default callee. The operation of establishing the telephone call with the voice mail system is similar to that of the click-to-call (or third-party call) application: one party is the end-user, the second party is the voice mail system.

Program code (or software) of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and Visual C++.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof. Further, although described predominantly as software, embodiments of the described invention may be implemented in hardware (digital or analog), software, or a combination thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for integrating networked resource services and multimedia services, the method comprising:
    concurrently displaying on a screen of a multimedia device a video channel of a media broadcast and a graphical user interface having a plurality of graphical elements by which an end-user of the multimedia device can interact with a plurality of interactive applications that are each associated with a different networked resource, wherein the multimedia device stores different protocol messages for interacting with the different networked resources;
    receiving end-user input for interacting with one of the graphical elements;
    communicating at least one protocol message to interact with the associated networked resource based on the received end-user input, wherein the protocol message is communicated to a server that includes a plurality of application services, each of which corresponds with and supports a respective one of the interactive applications; and
    controlling the multimedia device based on a response to the at least one protocol message from the networked resource.

2. The method of claim 1, further comprising displaying a caller ID associated with an incoming telephone call on the screen of the multimedia device, and wherein the at least one protocol message includes an instruction to reject the incoming telephone call.

3. The method of claim 1, further comprising displaying a caller ID associated with an incoming telephone call on the screen of the multimedia device, and wherein the at least one protocol message includes an instruction to forward the incoming telephone call to another telephone number.

4. The method of claim 1, wherein the at least one protocol message includes an instruction to establish a telephone call between two parties, and further comprising prompting the end-user on the screen of the multimedia device, in response to the selection of the interactive application, to provide telephone numbers for the two parties.

5. The method of claim 1, wherein the displayed graphical user interface has a second graphical element by which an end-user of the multimedia device can select execution of a second interactive application; and
further comprising:
    sending, in response to a selection of the second interactive application, one of the protocol messages for requesting an RSS (Really Simple Syndication) feed from one of the networked resources; and
    displaying the RSS feed on the screen of the multimedia device.

6. The method of claim 1, wherein the displayed graphical user interface has a second graphical element by which an end-user of the multimedia device can select execution of a second interactive application; and
further comprising:
    sending, in response to a selection of the second interactive application, one of protocol messages for requesting access to an address book; and
    displaying contacts in the address book on the screen of the multimedia device.

7. The method of claim 1, wherein the displayed graphical user interface has a second graphical element by which an end-user of the multimedia device can select execution of a second interactive application; and
further comprising:
    receiving notification at the multimedia device of an incoming SMS (Short Message Service) message in accordance with one or more of the protocol messages; and
    displaying, in response to a selection of the second interactive application by the end-user, contents of the incoming SMS message on the screen of the multimedia device.

8. The method of claim 1, wherein the displayed graphical user interface has a second graphical element by which an end-user of the multimedia device can select execution of a second interactive application; and
further comprising:
    retrieving, in response to a selection of the second interactive application by the end-user, a log of telephone calls or of SMS messages involving the multimedia device in accordance with one or more of the protocol Messages; and
    displaying the log of telephone calls or SMS messages on the screen of the multimedia device.

9. The method of claim 1, wherein the displayed graphical user interface has a second graphical element by which an end-user of the multimedia device can select execution of a second interactive application; and
further comprising:
    receiving notification at the multimedia device of a new voice mail message that awaits at a voice mail server in accordance with one or more of the protocol messages; and
    establishing, in response to a selection of the second interactive application by the end-user, a telephone call between a communication device and the voice mail server.

10. A system for integrating networked resource services and multimedia services, the system comprising:
    a server component configured to communicate with different networked resources by use of different protocol messages in order to provide a service to one or more client components that request the service; and
    a client component in communication with the server component and configured to:
    display concurrently on a screen of a multimedia device a video channel of a media broadcast and a graphical user interface having a plurality of graphical elements by which an end-user of the multimedia device can interact with a plurality of interactive applications that are each associated with different networked resources, wherein the multimedia device stores the different protocol messages for interacting with the different networked resources;
    receive end-user input for interacting with one of the graphical elements;
    communicate at least one protocol message to interact with the associated networked resource, via the server component, based on the received end-user input; and
    control the multimedia device based on a response to the at least one protocol message;

wherein the server component is communicatively between the client component and the associated networked resource and is further configured to respond to the at least one protocol message by communicating with the associated networked resource to acquire a desired service, further wherein the server has a plurality of application services, each of which corresponds with and supports a respective one of the interactive applications.

11. The system of claim 10, wherein the client component is further configured to display a caller ID associated with an incoming telephone call on the screen of the multimedia device.

12. The system of claim 11, wherein the at least one protocol message includes an instruction to reject the incoming telephone call.

13. The system of claim 11, wherein the at least one protocol message includes an instruction to forward the incoming telephone call to another telephone number.

14. The system of claim 10, wherein the at least one protocol message includes an instruction to establish a telephone call between two parties, and the client component is further configured to prompt the end-user on the screen of the multimedia device, in response to the selection of the interactive application, to provide telephone numbers for the two parties.

15. The system of claim 10, wherein the displayed graphical user interface has a second graphical element by which an end-user of the multimedia device can select execution of a second interactive application; and
wherein the client component is further configured to:
send, in response to a selection of the second interactive application, one of the protocol messages for requesting an RSS (Really Simple Syndication) feed from one of the networked resources; and
display the RSS feed on the screen of the multimedia device.

16. The system of claim 10, wherein the displayed graphical user interface has a second graphical element by which an end-user of the multimedia device can select execution of a second interactive application; and
wherein the client component is further configured to:
send, in response to a selection of the second interactive application, one of the protocol messages for requesting access to an address book; and
display contacts in the address book on the screen of the multimedia device.

17. The system of claim 10, wherein the displayed graphical user interface has a second graphical element by which an end-user of the multimedia device can select execution of a second interactive application and wherein the client component is further configured to:
provide notification at the multimedia device of an incoming SMS (Short Message Service) message in accordance with one or more of the protocol messages; and
display, in response to a selection of the second interactive application by the end-user, contents of the incoming SMS message on the screen of the multimedia device.

18. The system of claim 10, wherein the displayed graphical user interface has a second graphical element by which an end-user of the multimedia device can select execution of a second interactive application and wherein the client component is further configured to:
request, in response to a selection of the second interactive application by the end-user, a log of telephone calls or of SMS messages involving the multimedia device in accordance with one or more of the protocol messages; and
display on the screen of the multimedia device the log of telephone calls or SMS messages received in response to the request.

19. The system of claim 10, wherein the displayed graphical user interface has a second graphical element by which an end-user of the multimedia device can select execution of a second interactive application and wherein the client component is further configured to:
provide notification at the multimedia device of a new voice mail message that awaits at a voice mail server in accordance with one or more of the protocol messages; and
establish, in response to a selection of the second interactive application by the end-user, a telephone call between a communication device and the voice mail server.

20. The system of claim 10, in which the client component includes middleware that includes the interactive applications;
further in which the server component includes a corresponding application service to support each of the interactive applications.

21. The system of claim 10, in which at startup of the multimedia device, the multimedia device sends a telephone number of a separate telephone device to be associated with the multimedia device.

22. A receiver for integrating networked resource services and multimedia services, the receiver comprising:
memory storing middleware with an application program interface (API) for providing interactive services at a multimedia device and storing a plurality of interactive applications that are each configured to call the API of the middleware and to invoke a request for a service of one of a plurality of networked resources when executed, and wherein the memory stores different protocol messages for use by the interactive applications to interact with a supporting application service at a server to acquire the different networked resources;
a video output controller for presenting a video channel of a media broadcast and a graphical user interface to a multimedia device for concurrent display on a screen of the multimedia device, the graphical user interface having a plurality of graphical elements by which an end-user of the multimedia device can interact with the interactive applications to utilize the services of the networked resources; and
a processor programmed to execute one of the interactive applications in response to a selection of the interactive applications by the end-user and to communicate at least one protocol message to the supporting application service to request an associated service via the server, which is communicatively between the receiver and the networked resources.

23. The receiver of claim 22, wherein the processor is further programmed to provide to the video output controller a caller ID associated with an incoming telephone call for display on the screen of the multimedia device.

24. The receiver of claim 23, wherein the at least one protocol message includes an instruction to reject the incoming telephone call.

25. The receiver of claim 23, wherein the at least one protocol message includes an instruction to forward the incoming telephone call to another telephone number.

26. The receiver of claim 22, wherein the at least one protocol message includes an instruction to establish a telephone call between two parties, and the processor is further programmed, in response to the selection of the interactive application, to prompt the end-user on the screen of the multimedia device to provide telephone numbers for the two parties.

27. The receiver of claim 22, wherein the displayed graphical user interface has a second graphical element by which an end-user of the multimedia device can select execution of a second interactive application; and
wherein the processor is programmed, in response to a selection of the second interactive application, to:
- send one of the protocol messages for requesting an RSS (Really Simple Syndication) feed from one of the networked resources; and
- provide the RSS feed to the video output controller for display on the screen of the multimedia device.

28. The receiver of claim 22, wherein the displayed graphical user interface has a second graphical element by which an end-user of the multimedia device can select execution of a second interactive application; and
wherein the processor is programmed, in response to a selection of the second interactive application, to:
- send one of the protocol messages for requesting access to an address book; and
- provide contacts in the address book to the video output controller for display on the screen of the multimedia device.

29. The receiver of claim 22, wherein the displayed graphical user interface has a second graphical element by which an end-user of the multimedia device can select execution of a second interactive application; and
wherein the processor is programmed, in response to a selection of the second interactive application to:
- provide notification at the multimedia device of an incoming SMS (Short Message Service) message in accordance with one or more of the protocol messages; and
- display, in response to a selection of the second interactive application by the end-user, contents of the incoming SMS message on the screen of the multimedia device.

30. The receiver of claim 22, wherein the displayed graphical user interface has a second graphical element by which an end-user of the multimedia device can select execution of a second interactive application; and
wherein the processor is programmed, in response to a selection of the second interactive application to:
- retrieving, in response to a selection of the second interactive application by the end-user, a log of telephone calls or of SMS messages involving the multimedia device in accordance with one or more of the protocol messages; and
- displaying the log of telephone calls or SMS messages on the screen of the multimedia device.

31. The receiver of claim 22, wherein the displayed graphical user interface has a second graphical element by which an end-user of the multimedia device can select execution of a second interactive application; and
wherein the processor is programmed, in response to a selection of the second interactive application to:
- provide notification at the multimedia device of a new voice mail message that awaits at a voice mail server in accordance with one or more of the protocol messages; and
- establish, in response to a selection of the second interactive application by the end-user, a telephone call between a communication device and the voice mail server.

32. The receiver of claim 22, in which at startup of the multimedia device, the multimedia device sends a telephone number of a separate telephone device to be associated with the multimedia device.

* * * * *